(12) United States Patent
Yasumura

(10) Patent No.: US 7,285,875 B2
(45) Date of Patent: Oct. 23, 2007

(54) RESONANT CONVERTER WITH OUTPUTS OF DIFFERENT POLARITIES

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 154 days.

(21) Appl. No.: 11/225,733

(22) Filed: Sep. 13, 2005

(65) Prior Publication Data

US 2006/0077600 A1     Apr. 13, 2006

(30) Foreign Application Priority Data

Sep. 30, 2004   (JP)   ............... 2004-286162

(51) Int. Cl.
*H02B 1/24*   (2006.01)
(52) U.S. Cl. ..................................... 307/127
(58) Field of Classification Search ................ 307/127, 307/138, 28, 32, 75, 83; 363/63, 16
See application file for complete search history.

(56) References Cited

U.S. PATENT DOCUMENTS

| | | | |
|---|---|---|---|
| 4,128,868 A | 12/1978 | Gamble | |
| 5,274,543 A | 12/1993 | Loftus, Jr. | |
| 6,285,567 B1 | 9/2001 | Kennedy | |
| 6,310,792 B1 | 10/2001 | Drobnik | |
| 6,366,476 B1 | 4/2002 | Yasumura et al. | |
| 6,483,721 B2 | 11/2002 | Terashi et al. | |
| 6,515,875 B2 | 2/2003 | Yasumura et al. | |
| 6,583,999 B1 | 6/2003 | Spindler et al. | |
| 6,654,259 B2 | 11/2003 | Koshita et al. | |
| 6,687,137 B1 | 2/2004 | Yasumura et al. | |
| 6,831,846 B2 | 12/2004 | Yasumura et al. | |
| 6,930,893 B2 | 8/2005 | Vinciarelli | |
| 6,934,167 B2 | 8/2005 | Jang et al. | |
| 7,054,167 B2 | 5/2006 | Yasumura et al. | |
| 7,145,785 B2 * | 12/2006 | Yasumura | ............ 363/16 |

FOREIGN PATENT DOCUMENTS

| | | |
|---|---|---|
| JP | 06-327246 A | 11/1994 |
| JP | 2000-134925 A | 5/2000 |
| JP | 2000-152617 A | 5/2000 |
| JP | 2003-235259 A | 8/2003 |
| JP | 2004-194105 A | 7/2004 |

* cited by examiner

*Primary Examiner*—Shawn Riley
(74) *Attorney, Agent, or Firm*—Lerner, David, Littenberg, Krumholz & Mentlik, LLP

(57) ABSTRACT

A secondary side series resonant circuit formed by at least one secondary winding and a secondary side series resonant capacitor is provided together with a secondary side series resonant circuit forming a current resonant converter, whereby a coupling type resonant circuit is formed by magnetic coupling of an isolated converter transformer. For this coupling type resonant circuit to obtain a unimodal characteristic, a gap G formed in a core of the isolated converter transformer PIT is set to about 2.4 mm, and a coupling coefficient k is set to k=0.65 or lower. Thereby, the variable control range of switching frequency can be reduced, and a wide range-ready configuration can be realized. Also, since the variable control range of the switching frequency can be thus reduced, cross regulation of secondary side direct-current output voltage −Eo can be improved.

5 Claims, 15 Drawing Sheets

VAC=100V, PoMAX=150W

VAC=230V, PoMAX=150W

RESONANT CONVERTER WITH OUTPUTS OF DIFFERENT POLARITIES

CROSS-REFERENCE TO RELATED APPLICATIONS

This application is claims priority from Japanese Patent Application No. JP 2004-286162, filed on Sep. 30, 2004, the disclosure of which is hereby incorporated by reference.

BACKGROUND OF THE INVENTION

The present invention relates to a switching power supply circuit provided as a power supply for various electronic devices.

[Patent Document 1]

Japanese Patent Laid-open No. 2003-235259

The present applicant has previously proposed various power supply circuits having a resonant converter on a primary side.

FIG. 16 is a circuit diagram showing an example of a switching power supply circuit having a resonant converter which circuit is formed on the basis of an invention previously devised by the present applicant.

The switching converter of the power supply circuit shown in FIG. 16 is formed by combining an externally excited current resonant converter of a half-bridge coupling system with a partial voltage resonant circuit performing voltage resonant operation only at the time of turn-off in switching.

Two secondary side direct-current output voltages having the same positive and negative levels are output, as shown in the figure.

The power supply circuit deals with load conditions of load power Po=0 W to 150 W, secondary side direct-current output voltage Eo=±35 V or lower, and load current=10 A or lower.

In the power supply circuit shown in FIG. 16, a common mode noise filter including two filter capacitors CL and CL and one common mode choke coil CMC is connected to a commercial alternating-current power supply AC.

As a rectifying and smoothing circuit for generating a direct-current input voltage from the commercial alternating-current power supply AC, a full-wave rectifier circuit including a bridge rectifier circuit Di and a smoothing capacitor Ci is provided in a stage subsequent to the common mode noise filter.

The smoothing capacitor Ci is charged with the rectification output of the bridge rectifier circuit Di, whereby a rectified and smoothed voltage Ei (direct-current input voltage) having a level corresponding to once an alternating input voltage VAC is obtained across the smoothing capacitor Ci.

A switching circuit system formed by connecting two switching devices Q1 and Q2 formed by a MOS-FET by half-bridge coupling as shown in the figure is provided as the current resonant converter supplied with the direct-current input voltage and switching the direct-current input voltage. Damper diodes DD1 and DD2 formed by body diodes are connected in parallel with the switching devices Q1 and Q2 between the drain and the source of the switching devices Q1 and Q2, respectively, in a direction shown in the figure.

A partial resonant capacitor Cp is connected in parallel with the drain and the source of the switching device Q2. The capacitance of the partial resonant capacitor Cp and the leakage inductance L1 of a primary winding N1 form a parallel resonant circuit (a partial voltage resonant circuit) A partial voltage resonant operation, in which voltage resonance occurs only when the switching devices Q1 and Q2 are turned off, is thereby obtained by the partial voltage resonant circuit.

The power supply circuit is provided with an oscillation and drive circuit 2 formed by a general-purpose IC, for example, to switching-drive the switching devices Q1 and Q2. The oscillation and drive circuit 2 has an oscillating circuit and a driving circuit. A drive signal (gate voltage) of a required frequency is applied to the gates of the switching devices Q1 and Q2. Thus the switching devices Q1 and Q2 perform switching operation so as to be turned on/off alternately at the required switching frequency.

An isolated converter transformer PIT (Power Isolation Transformer) transmits the switching output of the switching devices Q1 and Q2 to a secondary side.

One end of the primary winding N1 of the isolated converter transformer PIT in this case is connected to a point of connection (a switching output point) between the source of the switching device Q1 and the drain of the switching device Q2 via a primary side series resonant capacitor C1. Thereby the switching output is obtained.

Another end of the primary winding N1 is connected to a primary side ground, as shown in the figure.

In this case, the primary winding N1 and the series resonant capacitor C1 are connected in series with each other. The capacitance of the series resonant capacitor C1 and the leakage inductance L1 of the primary winding N1 (series resonant winding) of the isolated converter transformer PIT form a primary side series resonant circuit for converting the operation of the switching converter into a current resonance type operation.

According to the description thus far, the primary side switching converter shown in this figure obtains the current resonance type operation by the primary side series resonant circuit (L1-C1) and the partial voltage resonant operation by the partial voltage resonant circuit (Cp//L1) described above.

That is, the power supply circuit shown in this figure employs a form in which the resonant circuit for making the primary side switching converter a resonant converter is combined with another resonant circuit. Such a switching converter will herein be referred to as a complex resonant converter.

Though not described with reference to a drawing, the structure of the isolated converter transformer PIT described above has an EE type core formed by combining E-type cores of ferrite material, for example, with each other. A primary side winding part and a secondary winding part are divided from each other, and the primary winding N1 and a secondary winding N2 are wound around the inner magnetic leg of the EE type core.

A gap having a length of 1.0 mm or less is formed in the inner magnetic leg of the EE type core of the isolated converter transformer PIT to obtain a coupling coefficient of 0.85 or higher between the primary winding N1 and the secondary winding N2.

In practice, the gap G=1.0 mm, and as for the number of turns of the primary winding N1 and the secondary winding N2, the primary winding N1=37 T (turns) and the secondary winding N2=12 T (6 T+6 T with a center tap as a boundary), whereby a coupling coefficient k=about 0.85 is obtained.

An output from the primary winding N1 is induced in the secondary winding N2 of the isolated converter transformer PIT.

The secondary winding N2 in this case is provided with a center tap connected to a secondary side ground as shown in the figure to be divided into a secondary winding part N2A and a secondary winding part N2B.

The secondary winding part N2A is a winding part on the side of a winding termination end part of the secondary winding N2 as a whole. The secondary winding part N2B is a winding part on the side of a winding start end part of the secondary winding N2 as a whole. That is, on the secondary side in this case, the secondary winding part N2B is wound around the central magnetic leg of the isolated converter transformer PIT, and the secondary winding part N2A is wound around the outside of the secondary winding part N2B. In other words, the secondary winding part N2B is wound in a lower part, and the secondary winding part N2A is wound in an upper part.

The secondary winding N2 is connected with two double-wave rectifier circuits formed by a set of a rectifier diode Do1A, a rectifier diode Do2A, and a smoothing capacitor CoA and a set of a rectifier diode Do1B, a rectifier diode Do2B, and a smoothing capacitor CoB shown in the figure.

In this case, of the two secondary side direct-current output voltages Eo having the same positive and negative levels mentioned above, the secondary side direct-current output voltage +Eo of positive polarity is generated by the double-wave rectifier circuit formed by the set of the rectifier diode Do1A, the rectifier diode Do2A, and the smoothing capacitor CoA. The secondary side direct-current output voltage −Eo of negative polarity is generated by the double-wave rectifier circuit formed by the set of the rectifier diode Do1B, the rectifier diode Do2B, and the smoothing capacitor CoB.

The rectifier diode Do1A has an anode connected to the winding termination end part of the secondary winding part N2A, and a cathode connected to the positive electrode terminal of the smoothing capacitor CoA. The rectifier diode Do2A has an anode connected to the winding start end part of the secondary winding part N2B, and a cathode connected to a point of connection between the cathode of the rectifier diode Do1A and the positive electrode terminal of the smoothing capacitor CoA.

The rectifier diode Do1B has a cathode side connected to the winding start end part of the secondary winding part N2B, and an anode side connected to the negative electrode terminal of the smoothing capacitor CoB. The rectifier diode Do2B has a cathode side connected to the winding termination end part of the secondary winding part N2A, and an anode side connected to a point of connection between the rectifier diode Do1B and the negative electrode terminal of the smoothing capacitor CoB.

The negative electrode terminal of the smoothing capacitor CoA and the positive electrode terminal of the smoothing capacitor CoB are connected to each other, and a point of connection between the negative electrode terminal of the smoothing capacitor CoA and the positive electrode terminal of the smoothing capacitor CoB is connected to the secondary side ground.

In these double-wave rectifier circuits, in one half period of an alternating voltage induced in the secondary winding N2, the rectifier diode Do1A conducts to charge the smoothing capacitor CoA with a rectification current I1 shown in the figure, while the rectifier diode Do1B conducts to charge the smoothing capacitor CoB with a rectification current I2.

In another half period, the rectifier diode Do2A conducts to charge the smoothing capacitor CoA with a rectification current I2, and the rectifier diode Do2B conducts to charge the smoothing capacitor CoB with a rectification current I1.

That is, by such an operation, the smoothing capacitor CoA is charged in each half period. The other smoothing capacitor CoB is also charged in each half period.

Then, as shown in the figure, the secondary side direct-current output voltage +Eo of positive polarity is extracted from the positive electrode terminal of the smoothing capacitor CoA. The secondary side direct-current output voltage −Eo of negative polarity is extracted from the negative electrode terminal of the smoothing capacitor CoB.

The secondary side direct-current output voltage +Eo obtained by the smoothing capacitor CoA and the secondary side direct-current output voltage −Eo obtained by the smoothing capacitor CoB are each supplied to a load side not shown in the figure.

In this case, the secondary side direct-current output voltage +Eo obtained on the smoothing capacitor CoA side branches off to be input also as a detection voltage for constant-voltage control to a control circuit 1.

The control circuit 1 outputs a control signal as a voltage or a current having a level varied in such a manner as to correspond to the level of the secondary side direct-current output voltage +Eo to the oscillation and drive circuit 2.

The oscillation and drive circuit 2 changes the frequency of a switching driving signal applied to the gates of the switching devices Q1 and Q2 by varying the frequency of an oscillating signal generated by the oscillating circuit within the oscillation and drive circuit 2 on the basis of the control signal input from the control circuit 1. Thereby the switching frequency is varied. By thus variably controlling the switching frequency of the switching devices Q1 and Q2 according to the level of the secondary side direct-current output voltage +Eo, the resonant impedance of the primary side series resonant circuit is changed, and energy transmitted from the primary winding N1 forming the primary side series resonant circuit to the secondary side is varied. Hence, the level of the secondary side direct-current output voltage −Eo is consequently controlled variably together with the secondary side direct-current output voltage +Eo. That is, constant-voltage control is performed on both secondary side direct-current output voltage +Eo and the secondary side direct-current output voltage −Eo.

Incidentally, a constant-voltage control system that achieves stabilization by thus variably controlling the switching frequency will hereinafter be referred to as a "switching frequency control system."

FIG. 17 shows operating waveforms of principal parts of the circuit shown in FIG. 16 as results of an actual experiment on the circuit shown in FIG. 16.

FIG. 17 shows experimental results when load power Po on the load side is set constant at 150 W (maximum load power) and alternating input voltage VAC is set constant at 100 V.

Incidentally, in obtaining the experimental results shown in the figure, parts of the circuit shown in FIG. 16 were selected as follows.

Isolated converter transformer PIT
gap length=1.0 mm, and coupling coefficient k=0.85
Primary winding N1=37 T
Secondary winding N2=12 T=secondary winding part N2A+
secondary winding part N2B=6 T+6 T
Primary side series resonant capacitor C1=0.033 μF
Partial resonant capacitor Cp=330 pF In FIG. 17, a voltage V1 is a voltage across the switching device Q2, and indicates on/off timing of the switching device Q2. That is, this voltage V1 indicates the switching period of switching operation on the primary side.

As shown in the figure, the peak level of the voltage V1 is clamped at the level of the rectified and smoothed voltage Ei.

A period during which the voltage V1 is at a zero level is an on period during which the switching device Q2 conducts. During this on period, a switching current IQ2 having a waveform as shown in the figure flows in a switching circuit system including the switching device Q2 and the clamping diode DD2. A period during which the voltage V1 is clamped at the level of the rectified and smoothed voltage Ei is a period during which the switching device Q2 is off and the switching current IQ2 is at a zero level as shown in the figure.

Though not shown in the figure, a voltage across the other switching device Q1 and a switching current flowing through a switching circuit (Q1 and DD1) have waveforms obtained by shifting the phases of the voltage V1 and the switching current IQ2 180°. That is, as described above, the switching device Q1 and the switching device Q2 perform switching operation in timing in which the switching device Q1 and the switching device Q2 are turned on/off alternately.

Though not shown in the figure, a primary side series resonance current Io flowing through the primary side series resonant circuit (C1-N1(L1)) flows having a waveform obtained by combining the switching currents flowing through the switching circuits (Q1 and DD1) and (Q2 and DD2) with each other.

Incidentally, the peak level of the switching current IQ2 in this case is 4.6 Ap, as shown in the figure.

Primary side operation with the above-described waveforms being obtained, an alternating voltage V2 having a waveform as shown in the figure is induced on the secondary winding part N2A side (and on the secondary winding part N2B side). In one half period in which the alternating voltage V2 is of positive polarity, the rectifier diodes Do1A and Do1B each conduct as described above. In a half period in which the alternating voltage V2 is of negative polarity, the rectifier diodes Do2A and Do2B each conduct. Thereby, the rectification current I1 flowing on the secondary winding part N2A side and the rectification current I2 flowing on the secondary winding part N2B side each flow having a waveform as shown in the figure in each positive or negative half period.

Incidentally, in this case, the peak level of the rectification current I1 was 8 Ap. The peak level of the rectification current I2 was 3.1 Ap.

SUMMARY OF THE INVENTION

When the configuration of a resonant converter that stabilizes secondary side direct-current output voltage by a switching frequency control system is employed as in the power supply circuit shown in FIG. 16, the variable control range of switching frequency for the stabilization tends to be relatively wide.

This will be described with reference to FIG. 18. FIG. 18 shows the constant-voltage control characteristics of the power supply circuit shown in FIG. 16 by relation between the switching frequency fs and the level of the secondary side direct-current output voltage Eo (the level of the secondary side direct-current output voltage +Eo in this case).

In the description of this figure, suppose that the power supply circuit of FIG. 16 employs so-called upper side control as a switching frequency control system. The upper side control refers to control in which the switching frequency is variably controlled in a range of frequencies higher than the resonant frequency fo of the primary side series resonant circuit, and a resulting change in the resonant impedance is used to control the level of the secondary side direct-current output voltage Eo.

As a general rule, the resonant impedance of a series resonant circuit is lowest at a resonant frequency fo. Thus, as relation between the secondary side direct-current output voltage Eo and the switching frequency fs in upper side control, the level of the secondary side direct-current output voltage Eo is raised as the switching frequency fs comes closer to a resonant frequency fo1, and the level of the secondary side direct-current output voltage Eo is lowered as the switching frequency fs goes away from the resonant frequency fo1.

Hence, the level of the secondary side direct-current output voltage Eo with respect to the switching frequency fs under a condition of constant load power Po changes in the manner of a quadratic curve in which the level of the secondary side direct-current output voltage Eo peaks when the switching frequency fs is equal to the resonant frequency fo1 of the primary side series resonant circuit and the level of the secondary side direct-current output voltage Eo decreases as the switching frequency fs goes away from the resonant frequency fo1, as shown in FIG. 18.

As for the levels of the secondary side direct-current output voltage Eo corresponding to the same switching frequency fs at the time of a minimum load power Pomin and at the time of a maximum load power Pomax, the level of the secondary side direct-current output voltage Eo at the time of the maximum load power Pomax is shifted so as to be decreased by a predetermined amount from the level of the secondary side direct-current output voltage Eo at the time of the minimum load power Pomin. That is, with the switching frequency fs fixed, the level of the secondary side direct-current output voltage Eo is lowered as the load becomes heavier.

With such characteristics, when the secondary side direct-current output voltage Eo is to be stabilized at Eo=tg by upper side control, the variable range (necessary control range) of the switching frequency which range is necessary in the power supply circuit shown in FIG. 16 is a range indicated by Δfs.

The power supply circuit shown in FIG. 16 in practice performs constant-voltage control so as to stabilize the secondary side direct-current output voltage Eo at 30 V, for example, by the switching frequency control system, dealing with an input variation range of the alternating input voltage VAC=85 V to 120 V as an AC 100 V system and load conditions of the maximum load power Pomax=150 W and the minimum load power Pomin=0 W (no load) of the secondary side direct-current output voltage Eo.

In this case, the variable range of the switching frequency fs varied for constant-voltage control by the power supply circuit shown in FIG. 16 is fs=about 80 kHz to 200 kHz, and thus Δfs is a correspondingly wide range of about 100 kHz.

A so-called wide range-ready power supply circuit is known which is configured to be able to operate dealing with an alternating input voltage range of about AC 85 V to 288 V, for example, to be ready for a region with an alternating input voltage AC 100 V system, such for example as Japan or the U.S., and a region with an AC 200 V system, such as Europe or the like.

Consideration will be given to configuring the power supply circuit shown in FIG. 16 as a wide range-ready power supply circuit as described above.

The wide range-ready power supply circuit is ready for an alternating input voltage range of AC 85 V to 288 V, for example, as described above. Therefore, the level variation range of the secondary side direct-current output voltage Eo is increased as compared with a case of a single range of only the AC 100 V system or only the AC 200 V system, for example. Constant-voltage control on the secondary side direct-current output voltage Eo whose level variation range is extended so as to be ready for such an alternating input voltage range requires a wider switching frequency control range. In the case of the circuit shown in FIG. 16, for example, the range of control of the switching frequency fs needs to be extended to a range of about 80 kHz to 400 kHz.

However, an upper limit of driving frequency that can be dealt with by an IC (the oscillation and drive circuit 2) for driving switching devices in the present situation is about 200 kHz. Even if a switching-driving IC capable of driving at such a high frequency is formed and mounted, driving switching devices at such a high frequency significantly decreases power conversion efficiency, thus rendering the power supply circuit impractical as a power supply circuit in practice.

The following configurations, for example, are known to make a switching power supply circuit that achieves stabilization by the switching frequency control system actually ready for a wide range.

In one of the configurations, a rectifier circuit system supplied with commercial alternating-current power and generating direct-current input voltage (Ei) is provided with a function of switching between a voltage doubler rectifier circuit and a full-wave rectifier circuit according to a commercial alternating-current power supply input of the AC 100 V system or the AC 200 V system.

In this case, the circuit is formed such that the level of the commercial alternating-current power is detected, and switching of circuit connection in the rectifier circuit system is performed by a switch using electromagnetic relays so as to form the voltage doubler rectifier circuit or the full-wave rectifier circuit according to the detected level.

However, such a switching configuration in the rectifier circuit system requires a predetermined number of electromagnetic relays, as described above. In addition, at least a set of two smoothing capacitors needs to be provided to form the voltage doubler rectifier circuit. Thus, the number of parts is correspondingly increased, resulting in an increase in cost, and the mounting area of a power supply circuit board is increased, resulting in an increase in size. These smoothing capacitors and electromagnetic relays in particular have a large size among parts forming the power supply circuit, thus considerably increasing the size of the board.

Furthermore, in the case of the configuration for switching between full-wave rectifier operation and voltage doubler rectifier operation, suppose that when for example an instantaneous power interruption occurs or the alternating input voltage decreases to a value lower than a rated voltage, and thus the level of the alternating input voltage becomes lower than a level corresponding to the AC 200 V system while the commercial alternating-current power of the AC 200 V system is input, an erroneous operation occurs in which it is detected that the level of the alternating input voltage corresponds to the AC 100 V system, and switching is performed to the voltage doubler rectifier circuit. When such an erroneous operation occurs, voltage doubler rectifier operation is performed on the alternating input voltage at the level of the AC 200 V system, and therefore for example the switching devices Q1 and Q2 may be unable to withstand the voltage and thus break down.

Accordingly, in order to prevent the above-described erroneous operation, an actual circuit detects not only the direct-current input voltage of the main switching converter but also the direct-current input voltage of a converter circuit on a standby power supply side. Thus, addition of parts for detecting the direct-current input voltage of the converter circuit on the standby power supply side and the like contribute to further increases in the cost and in the size of the circuit board described above.

In addition, detecting the direct-current input voltage of the converter on the standby power supply side for the purpose of preventing erroneous operation means that the wide range-ready power supply circuit having the circuit for switching rectification operation can be actually used in only electronic devices having a standby power supply in addition to a main power supply. That is, electronic devices in which the power supply circuit can be mounted are limited to types having a standby power supply, and thus a range of applications of the power supply circuit is correspondingly narrowed.

Another known configuration for a wide range capability switches the form of the primary side current resonant converter between half-bridge coupling and full-bridge coupling according to the commercial alternating-current power input of the AC 100 V system/AC 200 V system.

With this configuration, even when the alternating input voltage of the AC 200 V system is lowered to the level of the AC 100 V system due to an instantaneous power interruption as described above, for example, and thus an erroneous operation occurs, only switching operation is changed from half-bridge operation to full-bridge operation without the switching devices and the like being unable to withstand the voltage. Hence the need for detecting the direct-current input voltage on the standby power supply side is eliminated, so that the power supply circuit can be used in electronic devices without a standby power supply. In addition, since the switching is not performed in a commercial power supply line, the circuit form switching can be performed by a semiconductor switch. Therefore the need for large switch parts such as electromagnetic relays is obviated.

This configuration, however, requires at least four switching devices for forming a full-bridge coupling so as to correspond to the AC 100 V system. That is, as compared with configuration of a converter by only a half-bridge coupling system which converter can be formed with two switching devices, two switching devices need to be added.

In addition, with this configuration, four switching devices perform switching operation in full-bridge operation, and three switching devices perform switching operation in half-bridge operation. While a resonant converter has low switching noise, increase in the number of switching devices that thus perform switching is disadvantageous in terms of switching noise.

Thus, none of the above configurations for wide range capability can avoid an increase in a circuit scale and an increase in cost due to an increase in the number of parts and the like as compared with a single range-ready configuration. In addition, there occur new problems not presented by a single range-ready configuration, such for example as a limited range of applications to devices in the case of the former configuration and increase in switching noise in the case of the latter configuration.

Further, a considerably wide switching frequency control range as in the power supply circuit shown in FIG. 16 causes another problem of degradation in quick response characteristics in stabilizing the secondary side direct-current output voltage Eo.

Some electronic devices involve operation that varies in such a manner as to change a load condition instantaneously between a maximum load state and substantially no load, for example. Such a load variation is referred to also as a switching load. A power supply circuit included in such a device needs to properly stabilize the secondary side direct-current output voltage in response to a load variation referred to as a switching load as described above.

However, with a wide switching frequency control range as described earlier with reference to FIG. 18, it takes a relatively long time to change to a switching frequency for setting the secondary side direct-current output voltage at a required level in response to a load variation such as a switching load as described above. That is, an unfavorable result is obtained as a constant-voltage control response characteristic.

Further, in the circuit shown in FIG. 16, the secondary winding N2 is provided with a center tap, and two rectifying and smoothing circuits formed by the double-wave rectifier circuits and the smoothing capacitors Co are provided to output a plurality of secondary side direct-current output voltages. In such a configuration, the output voltage (−Eo in this case) other than the output voltage held constant by the switching frequency control system is varied. This is so-called cross regulation.

An experimental result obtained shows that as the cross regulation characteristic of the circuit of FIG. 16, the variation range ΔEo of the secondary side direct-current output voltage −Eo=1.0 V with respect to the variation of the load power Po=150 W to 0 W.

Reasons that cross regulation thus deteriorates with the configuration of FIG. 16 are considered as follows.

As described above, the variable range of the switching frequency for load variation is wide in the circuit of FIG. 16. In actuality, at light load when the load power Po=around 25 W to 0 W, in particular, the switching frequency increases steeply. Experimental results show that when the switching frequency thus increases steeply at light load, the variation range of the secondary side direct-current output voltage −Eo not subjected to constant-voltage control tends to be extended.

In addition, as is understood from the waveforms of FIG. 17, the peak level of the rectification current I1 is high and the peak level of the rectification current I2 is low on the secondary side of the circuit of FIG. 16. Accordingly, the smoothing capacitor CoA for generating the secondary side direct-current output voltage +Eo on the secondary side of the circuit of FIG. 16 is charged with a rectification current having a high level in one half period of the alternating voltage of the secondary winding N2 and a rectification current having a low level in the other half period. The smoothing capacitor CoB for generating the secondary side direct-current output voltage −Eo is charged with a rectification current having a low level in the one half period and a rectification current having a high level in the other half period.

That is, the levels of the currents for charging the smoothing capacitors CoA and CoB in each half period alternate with each other.

Incidentally, an imbalance between the levels of the rectification currents flowing through the respective winding parts occurs as described above because one-sidedness of lines of magnetic force occurs between the secondary winding part N2A and the secondary winding part N2B that are each formed by the center tap provided for the secondary winding N2. In this case, as described above, the secondary winding part N2A is wound in the upper part, and the secondary winding part N2B is wound in the lower part, and therefore the level of the alternating voltage induced on the secondary winding part N2A side is higher. Thus, as shown in FIG. 17, the peak level of the rectification current I1 is higher than the peak level of the rectification current I2 in this case.

The secondary side direct-current output voltage +Eo is supplied as detection input to the control circuit 1, and controlled to be constant at all times by a constant-voltage control system. On the other hand, an open loop is provided for the secondary side direct-current output voltage −Eo. Also, in this case, a difference occurs in each half period between the levels of the currents for charging the smoothing capacitor CoA and the smoothing capacitor CoB, as described above. Thus, control for holding the secondary side direct-current output voltage +Eo constant does not act equally to hold the secondary side direct-current output voltage −Eo constant.

This is considered to be a factor in causing voltage variation in the secondary side direct-current output voltage −Eo not subjected to constant-voltage control.

In addition, such a difference in action of stabilizing control becomes particularly noticeable when the switching frequency is controlled to be high. That is, this is considered to be a factor in the tendency of cross regulation to deteriorate when the switching frequency increases steeply at light load as described above.

Accordingly, in view of the above problems, a switching power supply circuit according to an embodiment of the present invention is formed as follows.

First, the switching power supply circuit includes: switching means formed with a switching device supplied with a direct-current input voltage and performing switching operation; and switching-driving means for switching-driving the switching device.

The switching power supply circuit further includes an isolated converter transformer formed by winding a primary winding supplied with a switching output obtained by the switching operation of the switching means and a first secondary winding and a second secondary winding in which an alternating voltage is induced by the primary winding.

The switching power supply circuit further includes a primary side series resonant circuit formed by at least a leakage inductance component of the primary winding of the isolated converter transformer and a capacitance of a primary side series resonant capacitor connected in series with the primary winding, a first resonant frequency being set to the primary side series resonant circuit, the primary side series resonant circuit converting operation of the switching means into a current resonant type operation.

The switching power supply circuit further includes a first secondary side series resonant circuit formed by at least a leakage inductance component of the first secondary winding of the isolated converter transformer and a capacitance of a first secondary side series resonant capacitor connected in series with the first secondary winding, a second resonant frequency being set to the first secondary side series resonant circuit.

The switching power supply circuit further includes first secondary side direct-current output voltage generating means for generating a first secondary side direct-current output voltage by performing a rectifying operation on the alternating voltage obtained in the first secondary winding, and smoothing a rectification output resulting from the rectifying operation by a first secondary side smoothing capacitor.

The switching power supply circuit further includes second secondary side direct-current output voltage generating means for generating a second secondary side direct-current output voltage having a same absolute value level as the first secondary side direct-current output voltage and having different polarity from polarity of the first secondary side direct-current output voltage by performing a rectifying operation on the alternating voltage obtained in the second secondary winding, and smoothing a rectification output resulting from the rectifying operation by a second secondary side smoothing capacitor.

The switching power supply circuit further includes constant-voltage control means for performing constant-voltage control on the first secondary side direct-current output voltage by varying switching frequency of the switching means by controlling the switching-driving means according to level of the first secondary side direct-current output voltage.

In addition, length of a gap formed at a predetermined position of a core of the isolated converter transformer is set such that an output characteristic of an electromagnetic coupling type resonant circuit formed with the primary side series resonant circuit and the first secondary side series resonant circuit with respect to an input of a frequency signal of the switching frequency is a unimodal characteristic.

The thus formed switching power supply circuit generates the two secondary side direct-current output voltages having the same positive and negative levels on the basis of the outputs of the two secondary windings wound in the isolated converter transformer.

Also, the switching power supply circuit has the configuration of a switching converter in which the primary side series resonant circuit converting primary side switching operation into a current resonant type operation is formed, and further has a series resonant circuit formed on the first secondary winding side for generating the first secondary side direct-current output voltage to be supplied as detection input to the constant-voltage control means. With such a configuration, the switching power supply circuit according to the embodiment of the present invention forms a coupling type resonant circuit by magnetic coupling of the isolated converter transformer. In this case, by setting the length of the gap formed in the core of the isolated converter transformer to a predetermined length as described above and thereby obtaining a predetermined coupling coefficient, it is possible to obtain a steep unimodal characteristic as output characteristic with respect to the alternating voltage of the switching frequency as input to the coupling type resonant circuit. As a result, the variable range (necessary control range) of the switching frequency which range is necessary for stabilization can be reduced as compared with a case where a series resonant circuit is formed on only the primary side.

Since the variable range of the switching frequency which range is necessary for stabilization is thus reduced, increase in the switching frequency at light load, for example, is suppressed, and variation in the second secondary side direct-current output voltage is correspondingly suppressed, so that cross regulation is improved.

Thus, according to the embodiment of the present invention, the variable control range (necessary control range) of the switching frequency which range is necessary for constant-voltage control is reduced as compared with the conventional circuit. It is therefore possible to easily achieve a wide range-ready power supply circuit performing only switching frequency control.

Thus, since wide range capability is thus achieved by switching frequency control, it is not necessary to switch a rectifier circuit system according to the rated level of commercial alternating-current power, for example, or employ a configuration for switching a circuit between half-bridge coupling and full-bridge coupling, for example.

Thereby, for example, circuit component parts are correspondingly reduced and a board area is correspondingly reduced, a range of applications of the power supply circuit to electronic devices is extended, and the power supply circuit becomes advantageous in terms of switching noise.

In order to realize the configuration of the embodiment of the present invention, as a fundamental configuration, it suffices to provide at least a secondary side series resonant capacitor to a configuration having a series resonant circuit formed on only the primary side. The wide rage capability is thus achieved by adding a very small number of parts.

In addition, when the necessary control range of the switching frequency is reduced as described above, constant-voltage control response is improved in a case where load power is quickly varied between a maximum load and no load, for example. This provides higher reliability.

Further, when the necessary control range of the switching frequency is reduced, variation in the second secondary side direct-current output voltage (output voltage not subjected to constant-voltage control) is suppressed in the configuration generating the first secondary side direct-current output voltage and the second secondary side direct-current output voltage as in the present invention. Thus cross regulation can be improved as compared with the conventional circuit having a resonant circuit on only the primary side.

DETAILED DESCRIPTION OF THE PREFERRED EMBODIMENTS

Figure 1:
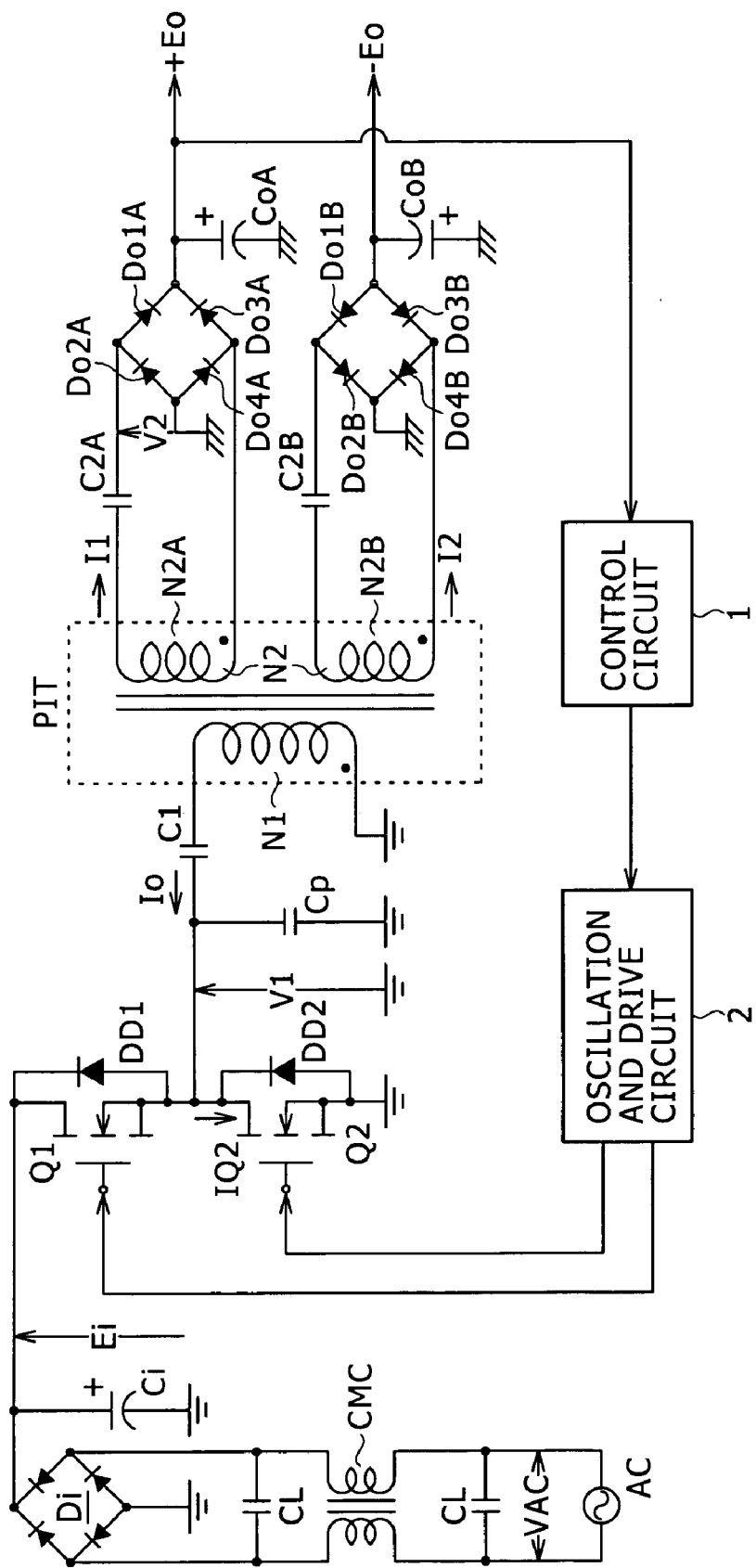
FIG. 1 is a circuit diagram showing an example of configuration of a power supply circuit according to a first embodiment of the present invention.

FIG. 1 is a circuit diagram showing an example of configuration of a switching power supply circuit according to a first embodiment in the best mode for carrying out the invention (hereinafter referred to also as an embodiment). The power supply circuit shown in this figure employs a configuration formed by combining an externally excited current resonant converter of a half-bridge coupling system with a partial voltage resonant circuit as a fundamental configuration on a primary side.

Also, the power supply circuit according to the first embodiment employs a so-called wide range-capable configuration so as to be operable dealing with both commercial alternating-current power supply inputs of an AC 100 V system and an AC 200 V system.

Also in this case, two secondary side direct-current output voltages having the same positive and negative levels are output.

The power supply circuit deals with a range of variation of a load power Po=about 150 W to Po=0 W (no load), for example. As with the circuit of FIG. 16, the power supply circuit in this case meets conditions of for example 35 V or lower as the absolute value level of the secondary side direct-current output voltage Eo and load current=10 A or lower.

The power supply circuit shown in FIG. 1 has a common mode noise filter formed by connecting filter capacitors CL and CL and a common mode choke coil CMC to a commercial alternating-current power supply AC.

A full-wave rectifying and smoothing circuit including a bridge rectifier circuit Di and one smoothing capacitor Ci is connected to a commercial alternating-current power supply AC line in a stage subsequent to the noise filter.

The full-wave rectifying and smoothing circuit is supplied with a commercial alternating-current power AC, and performs a full-wave rectifying operation, whereby a rectified and smoothed voltage Ei (direct-current input voltage) is obtained across the smoothing capacitor Ci. The rectified and smoothed voltage Ei in this case has a level corresponding to an alternating input voltage VAC multiplied by unity.

A switching circuit formed by connecting two switching devices Q1 and Q2 formed by a MOS-FET by half-bridge coupling as shown in the figure is provided as the current resonant converter supplied with the direct-current input voltage and switching (interrupting) the direct-current input voltage. Damper diodes DD1 and DD2 are connected in parallel with the switching devices Q1 and Q2 between the drain and the source of the switching devices Q1 and Q2, respectively. The anode and the cathode of the damper diode DD1 are connected to the source and the drain, respectively, of the switching device Q1. Similarly, the anode and the cathode of the damper diode DD2 are connected to the source and the drain, respectively, of the switching device Q2. The damper diodes DD1 and DD2 are the body diodes of the switching devices Q1 and Q2, respectively.

A primary side partial resonant capacitor Cp is connected in parallel with the drain and the source of the switching device Q2. The capacitance of the primary side partial resonant capacitor Cp and the leakage inductance L1 of a primary winding N1 form a parallel resonant circuit (a partial voltage resonant circuit). A partial voltage resonant operation, in which voltage resonance occurs only when the switching devices Q1 and Q2 are turned off, is thereby obtained.

The power supply circuit is provided with an oscillation and drive circuit 2 to switching-drive the switching devices Q1 and Q2. The oscillation and drive circuit 2 has an oscillating circuit and a driving circuit. A general-purpose IC, for example, can be used as the oscillation and drive circuit 2 in this case. The oscillating circuit in the oscillation and drive circuit 2 generates an oscillating signal of a required frequency. The driving circuit generates a switching driving signal, which is a gate voltage for switching-driving the MOS-FETs, using the oscillating signal. The switching driving signal is applied to the gates of the switching devices Q1 and Q2. Thus the switching devices Q1 and Q2 perform switching operation so as to be successively turned on/off in alternate timing according to a switching frequency corresponding to the period of the switching driving signal.

An isolated converter transformer PIT is provided to transmit the switching output of the switching devices Q1 and Q2 to a secondary side.

One end of the primary winding N1 of the isolated converter transformer PIT is connected to a point of connection (a switching output point) between the source of the switching device Q1 and the drain of the switching device Q2 via a series connection of a primary side series resonant capacitor C1. Thereby the switching output is transmitted. Another end of the primary winding N1 is connected to a primary side ground.

Figure 2:
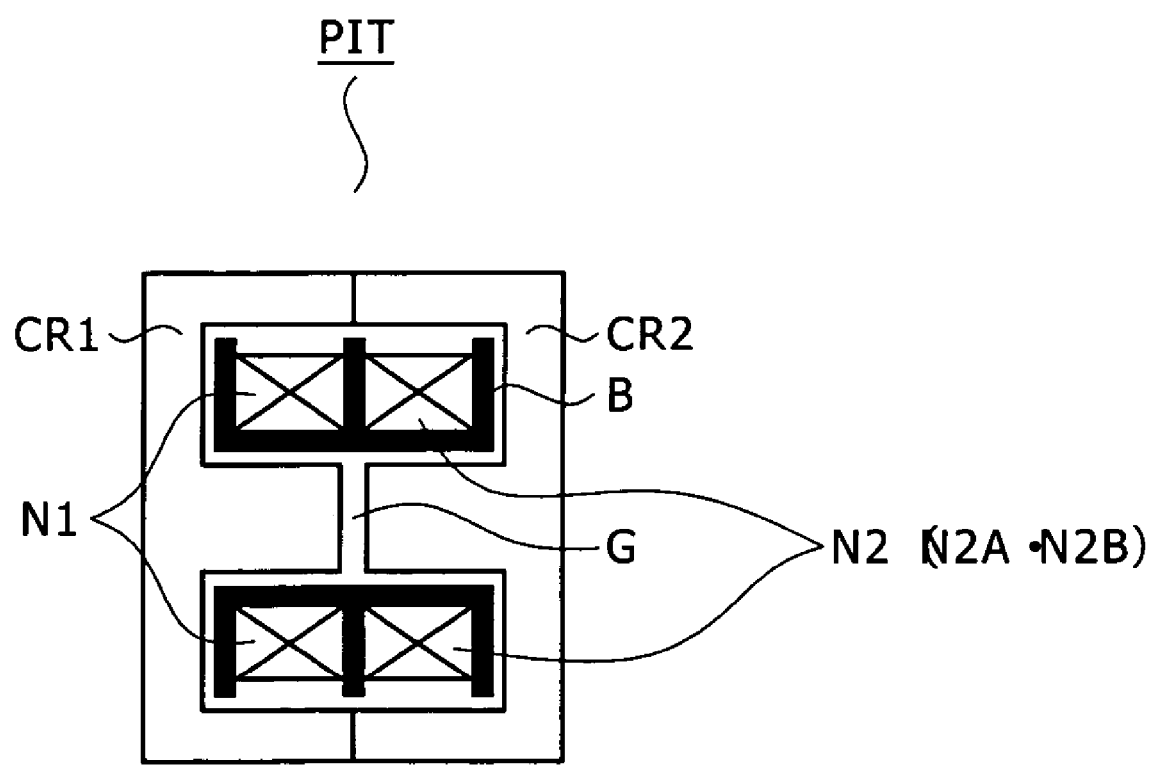
FIG. 2 is a sectional view of an example of structure of an isolated converter transformer provided in the switching power supply circuit according to the embodiment.

The isolated converter transformer PIT has a structure as shown in a sectional view of FIG. 2.

As shown in FIG. 2, the isolated converter transformer PIT has an EE type core (E-E-shaped core) formed by combining E-shaped cores CR1 and CR2 of ferrite material with each other in such a manner that the magnetic legs of the core CR1 are opposed to the magnetic legs of the core CR2.

A bobbin B is provided which is formed by a resin, for example, in a shape in which a primary side winding part and a secondary winding part are divided from each other so as to be independent of each other. The primary winding N1 is wound around one winding part of the bobbin B. A secondary winding N2 (a secondary winding N2A and a secondary winding N2B in this case) is wound around the other winding part of the bobbin B. The bobbin B thus wound with the primary side winding (N1) and the secondary side winding (N2) is attached to the above-described EE type core (CR1 and CR2). Thereby the primary side winding and the secondary side winding are wound around the inner magnetic leg of the EE type core in respective different winding regions. The structure of the isolated converter transformer PIT as a whole is thus obtained.

In addition, a gap G is formed in the inner magnetic leg of the EE type core as shown in the figure. The gap length of the gap G in this case is set to about 2.4 mm, for example. Thereby a state of loose coupling with a coupling coefficient k=about 0.65 or lower, for example, between the secondary side and the primary side is obtained. Incidentally, an actual coupling coefficient k is set to k=0.65. The gap G can be formed by making the inner magnetic leg of the E-type cores CR1 and CR2 shorter than the two outer magnetic legs of the E-type cores CR1 and CR2.

Figure 16:
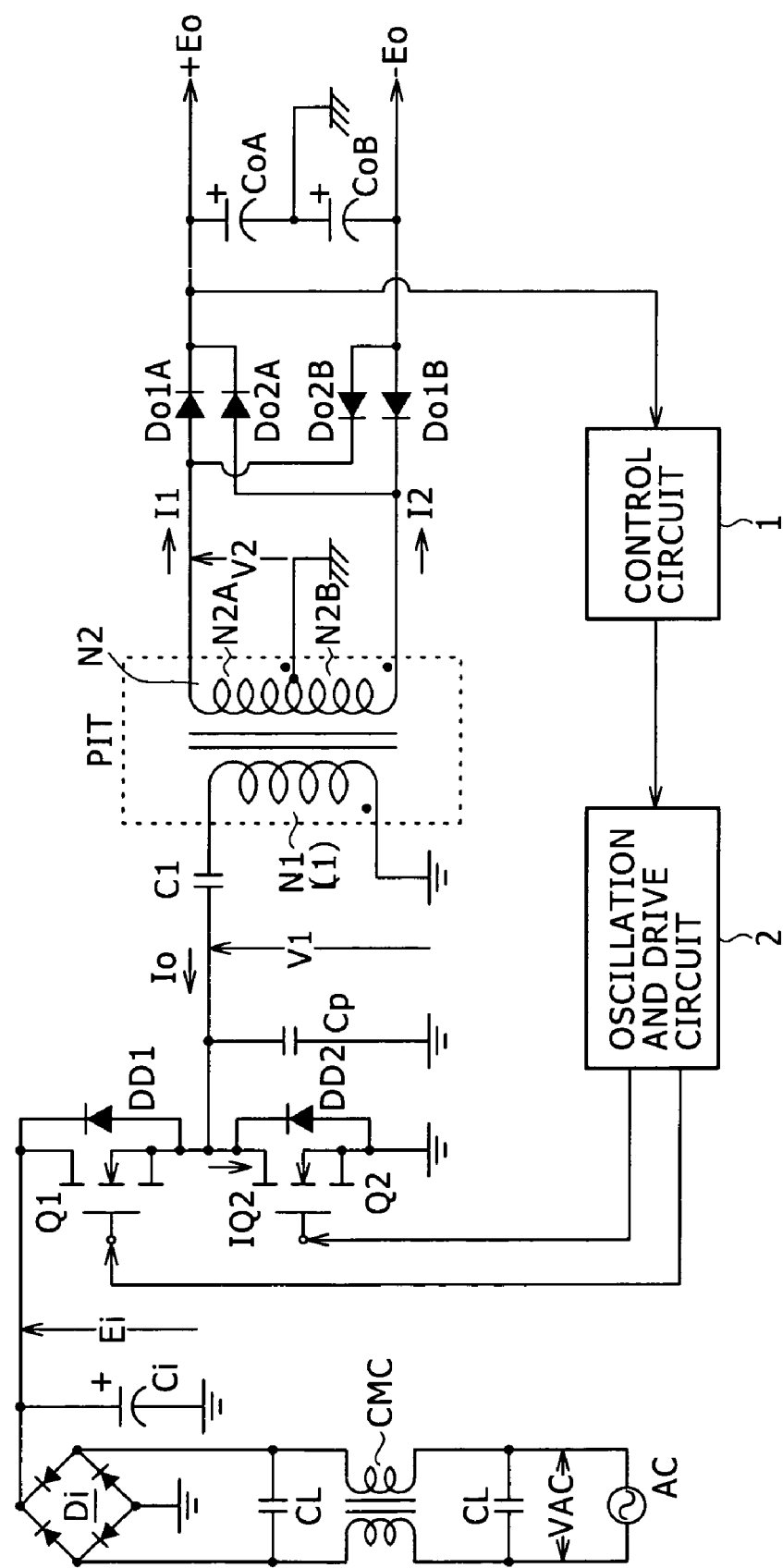
FIG. 16 is a circuit diagram showing an example of configuration of a prior art power supply circuit.
Figure 17:
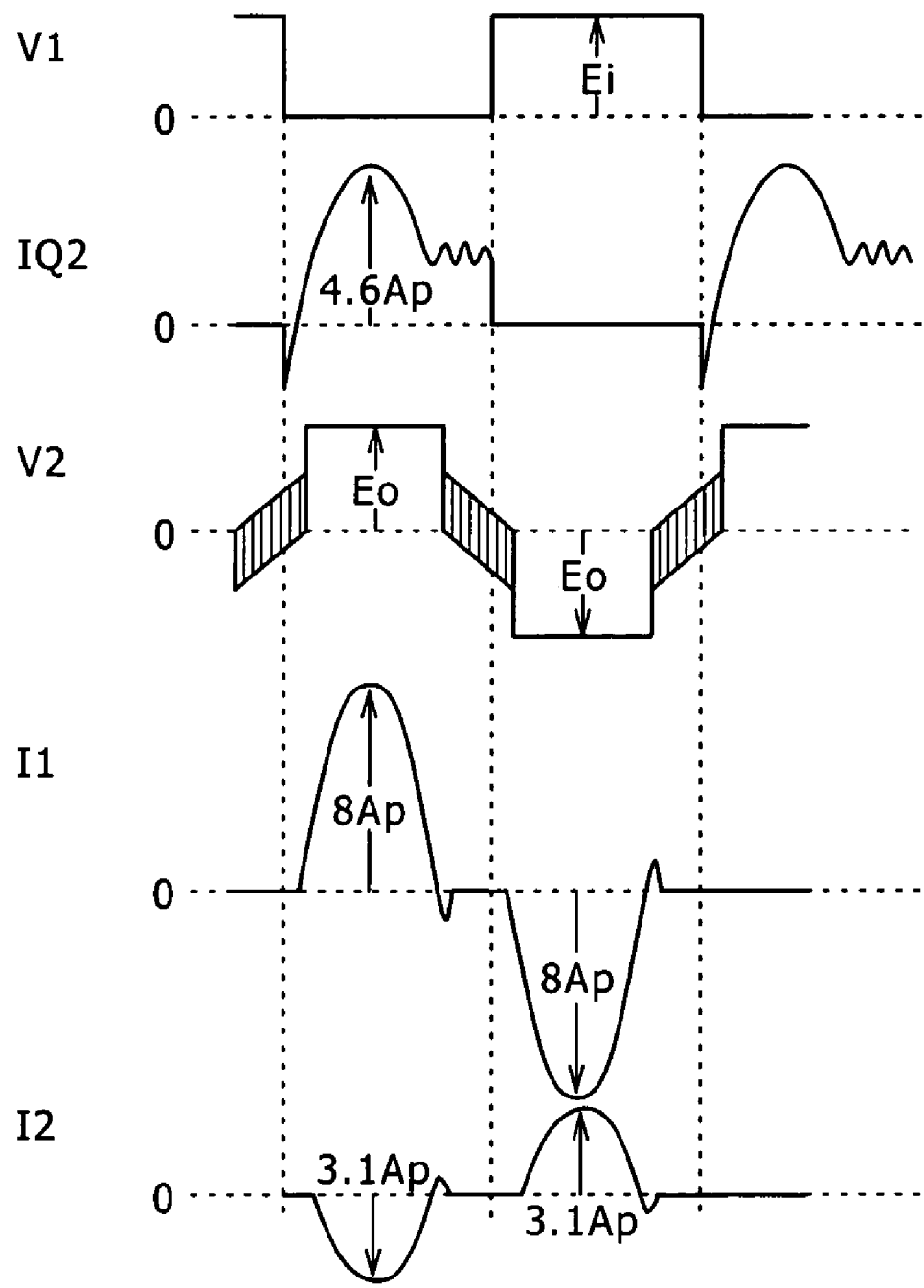
FIG. 17 is a waveform chart showing the operation of principal parts in the power supply circuit shown in FIG. 16.

Incidentally, when power supply circuits having conventional current resonant converters including the foregoing power supply circuit shown in FIG. 16 are configured to provide a relatively low level of 35 V or lower, for example, as the level of the secondary side direct-current output voltage Eo, the turns ratio of the secondary winding N2 to the primary winding N1 is set to a rather low value. In the conventional configuration in which the turns ratio of the secondary winding N2 to the primary winding N1 is thus set to a rather low value, a gap formed in the core of the isolated converter transformer PIT is set to about 1.0 mm or less, for example, whereby k=about 0.75 or higher is obtained as a coupling coefficient k.

That is, a degree of coupling between the primary side and the secondary side of the isolated converter transformer PIT in the first embodiment configured to similarly provide a relatively low level as the level of the secondary side direct-current output voltage Eo is lower than in the conventional power supply circuits.

Description will be returned to FIG. 1.

The isolated converter transformer PIT with the structure described with reference to FIG. 2 produces a predetermined leakage inductance L1 at the primary winding N1. As described above, the primary winding N1 and the primary side series resonant capacitor C1 are connected in series with each other. Therefore, the leakage inductance L1 of the primary winding N1 and the capacitance of the primary side series resonant capacitor C1 form a series resonant circuit (primary side series resonant circuit).

The primary side series resonant circuit is connected to the switching output point of the switching devices Q1 and Q2. The switching output of the switching devices Q1 and Q2 is therefore transmitted to the primary side series resonant circuit. The primary side series resonant circuit performs resonant operation according to the switching output transmitted thereto. Thereby the primary side series resonant circuit converts operation of a primary side switching converter into a current resonance type operation.

According to the description thus far, the primary side switching converter shown in this figure obtains the current resonance type operation by the primary side series resonant circuit (L1-C1) and the partial voltage resonant operation by the primary side partial voltage resonant circuit (Cp//L1) described above.

That is, the power supply circuit shown in this figure employs a configuration on the primary side in which the resonant circuit for making the primary side switching converter a resonant converter is combined with another resonant circuit. The switching converter formed by thus combining two resonant circuits together will herein be referred to as a "complex resonant converter".

An alternating voltage corresponding to the switching output transmitted to the primary winding N1 is excited (induced) in the secondary winding N2 of the isolated converter transformer PIT.

In this case, the two secondary windings N2A and N2B are wound as the secondary winding N2, as shown in the figure. A secondary side series resonant capacitor C2A and a secondary side series resonant capacitor C2B are connected in series with one end part side of the secondary winding N2A and the secondary winding N2B, respectively.

Thereby, the capacitance of the secondary side series resonant capacitor C2A and the leakage inductance L2A of the secondary winding N2A form a secondary side series resonant circuit, and the capacitance of the secondary side series resonant capacitor C2B and the leakage inductance L2B of the secondary winding N2B form a secondary side series resonant circuit. That is, in the first embodiment, a series resonant circuit is formed on each of the primary side and the secondary side of the isolated converter transformer PIT.

Incidentally, in this case, the same number of turns is set to the secondary winding N2A and the secondary winding N2B. Also, the same capacitance is set to the secondary side series resonant capacitor C2A and the secondary side series resonant capacitor C2B.

Full-wave rectifier circuits formed by bridge rectifier circuits including rectifier diodes Do1A to Do4A connected to each other and rectifier diodes Do1B to Do4B connected to each other as shown in the figure are connected to the respective secondary side series resonant circuits (L2A-C2A and L2B-C2B).

A smoothing capacitor CoA and a smoothing capacitor CoB are provided to these bridge rectifier circuits, respectively, as shown in the figure. Thereby, a full-wave rectifying and smoothing circuit is formed by the bridge rectifier circuit on the secondary winding N2A side and the smoothing capacitor CoA, and a full-wave rectifying and smoothing circuit is formed by the bridge rectifier circuit on the secondary winding N2B side and the smoothing capacitor CoB.

In this case, the bridge rectifier circuits on the secondary winding N2A side and the secondary winding N2B side are connected such that the polarity of the bridge rectifier circuit on the secondary winding N2A side is opposite to the polarity of the bridge rectifier circuit on the secondary winding N2B side. That is, the rectifier diodes Do1B to Do4B are connected in an opposite direction from the rectifier diodes Do1A to Do4A, respectively.

As shown in the figure, on the secondary winding N2A side, the positive electrode output terminal of the bridge rectifier circuit (point of connection between the rectifier diodes Do1A and Do3A) is connected to the positive electrode terminal of the smoothing capacitor CoA. The negative electrode terminal of the smoothing capacitor CoA and the negative electrode input terminal of the bridge rectifier circuit (point of connection between the rectifier diodes Do2A and Do4A) are both connected to a secondary side ground. A secondary side direct-current output voltage +Eo of positive polarity is thereby extracted from the positive electrode terminal side of the smoothing capacitor CoA.

On the secondary winding N2B side, the positive electrode output terminal of the bridge rectifier circuit (point of connection between the rectifier diodes Do2B and Do4B) and the positive electrode terminal of the smoothing capacitor CoB are both connected to the secondary side ground. The negative electrode input terminal of the bridge rectifier circuit (point of connection between the rectifier diodes Do1A and Do3A) is connected to the negative electrode terminal of the smoothing capacitor CoB. A secondary side direct-current output voltage −Eo of negative polarity is thereby extracted from the negative electrode terminal side of the smoothing capacitor CoB.

In the full-wave rectifier circuit on the secondary winding N2A side in the thus formed secondary side rectifying and smoothing circuits, the set of the rectifier diodes Do1A and Do4A conducts in one half period of the alternating voltage induced in the secondary winding N2A, to charge the smoothing capacitor CoA with a rectified current. In another half period of the alternating voltage, the set of the rectifier diodes Do2A and Do3A conducts to charge the smoothing capacitor CoA with a rectified current.

In the full-wave rectifier circuit on the secondary winding N2B side, the set of the rectifier diodes Do2B and Do3B conducts in one half period of the alternating voltage induced in the secondary winding N2B, to charge the smoothing capacitor CoB with a rectified current. In another half period of the alternating voltage, the set of the rectifier diodes Do4B and Do1B conducts to charge the smoothing capacitor CoB with a rectified current.

Thereby, the secondary side direct-current output voltage Eo having a level corresponding to the level of the alternating voltage multiplied by unity which voltage is induced in the secondary winding N2A is obtained across the smoothing capacitor CoA, and the secondary side direct-current output voltage Eo having a level corresponding to the level of the alternating voltage multiplied by unity which voltage is induced in the secondary winding N2B is obtained across the smoothing capacitor CoB.

In this case, since the secondary windings have the same number of turns, the secondary side direct-current output voltage +Eo and the secondary side direct-current output voltage −Eo have the same absolute value level.

The secondary side direct-current output voltage +Eo and the secondary side direct-current output voltage −Eo obtained as described above are supplied to a load not shown in the figure. Of the secondary side direct-current output voltage +Eo and the secondary side direct-current output voltage −Eo, the secondary side direct-current output voltage +Eo branches off to be input also as a detection voltage for a control circuit 1 to be described later.

The full-wave rectifier circuits rectify and smooth the oscillation outputs of the secondary side series resonant circuits, respectively. Thus, secondary side rectifying operation in this case is also of a current resonance type. That is, a rectified current waveform includes a sinusoidal waveform of the resonant frequency of the secondary side series resonant circuit.

According to the description thus far, the switching power supply circuit according to the first embodiment has the primary side series resonant circuit (L1-C1) and the primary side partial voltage resonant circuit (Cp//L1) on the primary side, and has the secondary side series resonant circuit (L2-C2) on the secondary side.

As described above, a switching converter formed by combining two resonant circuits formed by a series resonant circuit and a partial voltage resonant circuit as on the primary side is referred to as a complex resonant converter. A switching converter formed by combining three or more resonant circuits as in the first embodiment will herein be referred to as a "multiple resonant converter."

The control circuit 1 is provided to stabilize the secondary side direct-current output voltage +Eo by a switching frequency control system.

The control circuit 1 in this case supplies a detection output corresponding to a change in the level of the secondary side direct-current output voltage +Eo as detection input to the oscillation and drive circuit 2. The oscillation and drive circuit 2 drives the switching devices Q1 and Q2 such that the switching frequency of the switching devices Q1 and Q2 is varied according to the detection output supplied from the control circuit 1. For this, the frequency of the oscillating signal generated by the oscillating circuit within the oscillation and drive circuit 2 is varied.

By varying the switching frequency of the switching devices Q1 and Q2, the resonant impedance of the primary side series resonant circuit is changed, and thus an amount of power transmitted from the primary winding N1 to the secondary winding N2 side of the isolated converter transformer PIT is changed. Thereby the level of the secondary side direct-current output voltage Eo is stabilized.

Though to be described later in detail, in the switching frequency control system of the power supply circuit according to the first embodiment, a range of frequencies higher than an intermediate resonant frequency fo determined by the resonant frequency fo1 of the primary side series resonant circuit and the resonant frequency fo2 of the secondary side series resonant circuit is set as a switching frequency variable range. That is, a so-called upper side control system is employed.

As a general rule, the resonant impedance of the series resonant circuit is lowest at a resonant frequency. Thus, when the upper side control system based on the resonant frequency of the series resonant circuit is employed as in the first embodiment, the resonant impedance is increased as the switching frequency fs is increased.

Hence, as the secondary side direct-current output voltage Eo is lowered with increase in the load, for example, control is performed so as to decrease the switching frequency. This decreases the resonant impedance, and thus increases an amount of power transmitted from the primary side to the secondary side, so that the secondary side direct-current output voltage Eo is raised.

On the other hand, as the secondary side direct-current output voltage Eo is raised with decrease in the load, control is performed so as to increase the switching frequency. This increases the resonant impedance, and thus decreases the amount of power transmitted from the primary side to the secondary side, so that the secondary side direct-current output voltage Eo is lowered. Thus, by varying the switching frequency, the secondary side direct-current output voltage Eo is stabilized.

The power supply circuit of FIG. 1 having the above-described configuration has a series resonant circuit on each of the primary side and the secondary side (the primary side series resonant circuit (L1-C1) and the secondary side series resonant circuit (L2-C2)). As described with reference to FIG. 2, the coupling coefficient between the primary side and the secondary side of the isolated converter transformer PIT is set to a predetermined value or lower.

In the first embodiment, by employing such a configuration, the power supply circuit based on the current resonant converter can be put to practical use as a so-called wide range-ready power supply circuit that operates dealing with both commercial alternating-current power supply inputs of an AC 100 V system and an AC 200 V system. This will be described in the following.

Figure 3:
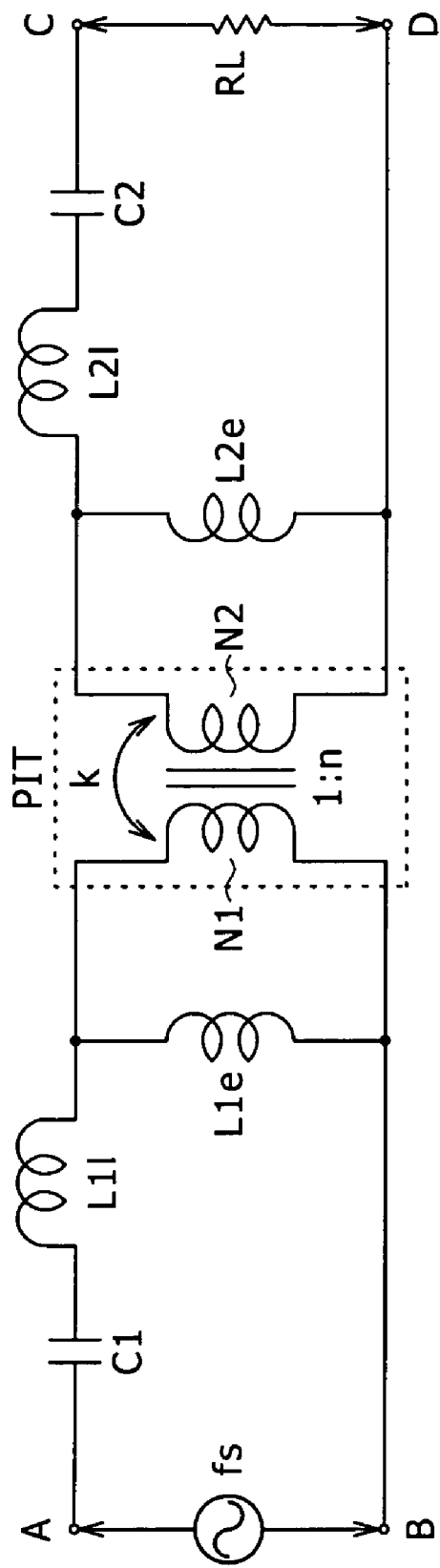
FIG. 3 is an equivalent circuit diagram in which the power supply circuit according to the embodiment is viewed as an electromagnetic coupling type resonant circuit.

A circuit diagram of FIG. 3 shows an equivalent circuit of the power supply circuit according to the first embodiment shown in FIG. 1 as viewed from a viewpoint of a relation between the primary side series resonant circuit and the secondary side series resonant circuit. Incidentally, in this equivalent circuit diagram, the same parts as in FIG. 1 are identified by the same reference numerals.

FIG. 3 shows the isolated converter transformer PIT wound with the primary winding N1 and the secondary winding N2 respectively having predetermined numbers of turns at a turns ratio of 1:n. In this figure, a degree of coupling between the primary side and the secondary side in the isolated converter transformer PIT is represented by a coupling coefficient k.

On the primary side of the isolated converter transformer PIT, L1$l$ and L1$e$ respectively denote the leakage inductance of the primary winding N1 and the exciting inductance of the primary winding N1. On the secondary side of the isolated converter transformer PIT, L21 and L2$e$ respectively denote the leakage inductance of the secondary winding N2 and the exciting inductance of the secondary winding N2.

In the equivalent circuit diagram of FIG. 3, an alternating current (frequency signal) of switching frequency fs is input on the primary side of the isolated converter transformer PIT. That is, the switching output of the primary side switching converter (switching devices Q1 and Q2) forms an input.

Then, the alternating current input of the switching frequency fs is supplied to the primary side series resonant circuit on the primary side of the isolated converter transformer PIT. As shown in the figure, this primary side series resonant circuit can be considered to be a circuit formed by connecting the primary side series resonant capacitor C1 and the leakage inductance L11 in series with the primary winding N1 and connecting the exciting inductance L1$e$ in parallel with the primary winding N1.

The series resonant circuit on the secondary side of the isolated converter transformer PIT can similarly be considered to be a circuit formed by connecting the secondary side series resonant capacitor C2 and the leakage inductance L21 in series with the secondary winding N2 and connecting the exciting inductance L2$e$ in parallel with the secondary winding N2. In this figure, the output of the secondary side series resonant circuit thus formed is supplied to a load RL. The load RL in this case is a circuit and load in a stage subsequent to the secondary side full-wave rectifier circuit.

In the equivalent circuit of FIG. 3 having the above-described connection mode, letting k be the coupling coefficient of the isolated converter transformer PIT and L1 be the self-inductance of the primary winding N1, the leakage inductance L11 of the primary winding N1 can be expressed by $$L11=(1-k^2)L1 \quad \text{(Equation 1)}$$

The exciting inductance L1$e$ of the primary winding N1 can be expressed by $$L1e=k^2 \times L1 \quad \text{(Equation 2)}$$

Similarly, letting L2 be the self-inductance of the secondary winding N2, the leakage inductance L21 of the secondary winding N2 and the exciting inductance L2$e$ of the secondary winding N2 are respectively expressed by $$L21=(1-k^2)L2 \quad \text{(Equation 3)}$$

$$L2e=k^2 \times L2 \quad \text{(Equation 4)}$$

The equivalent circuit shown in FIG. 3 has the primary side series resonant circuit on the primary side and the secondary side series resonant circuit on the secondary side which circuits are coupled to each other via electromagnetic induction of the isolated converter transformer PIT. Therefore the circuit shown in this figure can be considered to form a coupling type resonant circuit by electromagnetic coupling. Thus, the characteristic of constant-voltage control for the secondary side direct-current output voltage Eo in the power supply circuit shown in FIG. 1 differs according to the degree of coupling (coupling coefficient k) of the isolated converter transformer PIT. This will be described with reference to FIG. 4.

Figure 4:
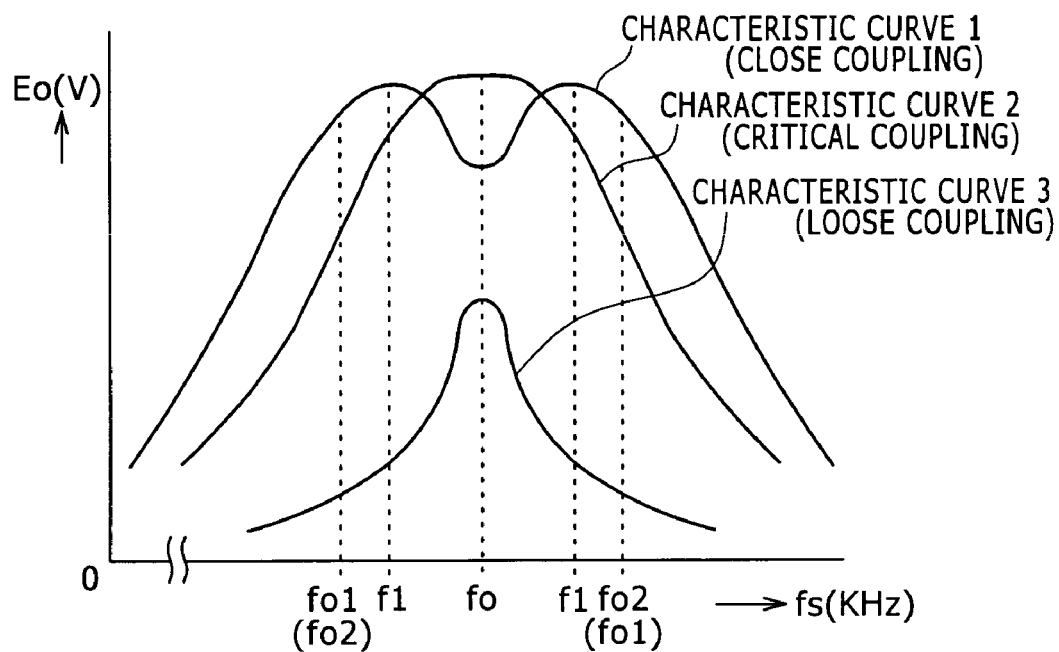
FIG. 4 is a diagram showing constant-voltage control characteristics of the power supply circuit according to the present embodiment.

FIG. 4 shows characteristics of output of the above-described equivalent circuit of FIG. 3 in response to input (switching frequency signal). That is, FIG. 4 represents characteristics of control of the secondary side direct-current output voltage Eo by relation of the secondary side direct-current output voltage Eo to the switching frequency fs. In this figure, an axis of abscissas indicates the switching frequency, and an axis of ordinates indicates the level of the secondary side direct-current output voltage Eo.

Incidentally, in this figure, the resonant frequency fo1 of the primary side series resonant circuit and the resonant frequency fo2 of the secondary side series resonant circuit are shown coinciding with each other. This indicates that similar characteristics are obtained regardless of set values of the resonant frequency fo1 and the resonant frequency fo2.

Suppose that a state of close coupling at a coupling coefficient k=1 as the degree of coupling of the isolated converter transformer PIT is set. Then, substituting k=1 into (Equation 1) and (Equation 3), the leakage inductance L11 of the primary winding N1 and the leakage inductance L21 of the secondary winding N2 in this case is expressed as $$L11=L21=0 \quad \text{(Equation 5)}$$

That is, since the isolated converter transformer PIT is closely coupled, the leakage inductances of the primary winding N1 and the secondary winding N2 are not present.

Thus, a constant-voltage control characteristic in the state of close coupling between the primary side and the secondary side of the isolated converter transformer PIT is a so-called bimodal characteristic in which the secondary side direct-current output voltage Eo peaks at frequencies f1 and f2 different from the resonant frequency fo1 of the primary side series resonant circuit and the resonant frequency fo2 of the secondary side series resonant circuit, as represented by a characteristic curve 1 in FIG. 4. The frequency f1 is expressed by $$f1=fo/\sqrt{1+k} \quad \text{(Equation 6)}$$

The frequency f2 is expressed by $$f2=fo/\sqrt{1-k} \quad \text{(Equation 7)}$$

A term fo in (Equation 6) and (Equation 7) is an intermediate resonant frequency intermediate between the resonant frequency fo1 of the primary side series resonant circuit and the resonant frequency fo2 of the secondary side series resonant circuit. The frequency fo is determined by a primary side impedance and a secondary side impedance and an impedance (mutual coupling inductance M) common to the primary side and the secondary side. The mutual coupling inductance M is expressed by $$M=k\sqrt{L1 \times L2} \quad \text{(Equation 8)}$$

When the above-described coupling coefficient k is gradually decreased from the state of k=1, that is, when a degree of loose coupling is gradually increased from the state of close coupling, the characteristic curve 1 shown in FIG. 4 is changed such that a bimodal tendency is gradually weakened and the characteristic curve is flattened around the intermediate resonant frequency fo. Then, a state of so-called critical coupling occurs when the coupling coefficient k is decreased to a certain coupling coefficient k. In this state of critical coupling, as represented by a characteristic curve 2, the bimodal characteristic tendency disappears, and the shape of the curve is flattened around the intermediate resonant frequency fo.

When the coupling coefficient k is further decreased from the state of critical coupling to a state of looser coupling, a unimodal characteristic in which the secondary side direct-current output voltage Eo peaks only at the intermediate frequency fo is obtained, as represented by a characteristic curve 3 in FIG. 4. A comparison of the characteristic curve 3 with the characteristic curves 1 and 2 indicates that while a peak level itself of the characteristic curve 3 is lower than those of the characteristic curves 1 and 2, the characteristic curve 3 has a steeper slope as a quadratic function curve shape than the characteristic curves 1 and 2.

A state of loose coupling at the coupling coefficient k≦0.65 is set in the isolated converter transformer PIT according to the first embodiment. When the coupling coefficient k is thus set, operation based on the unimodal characteristic represented as the characteristic curve 3 is performed.

Figure 18:
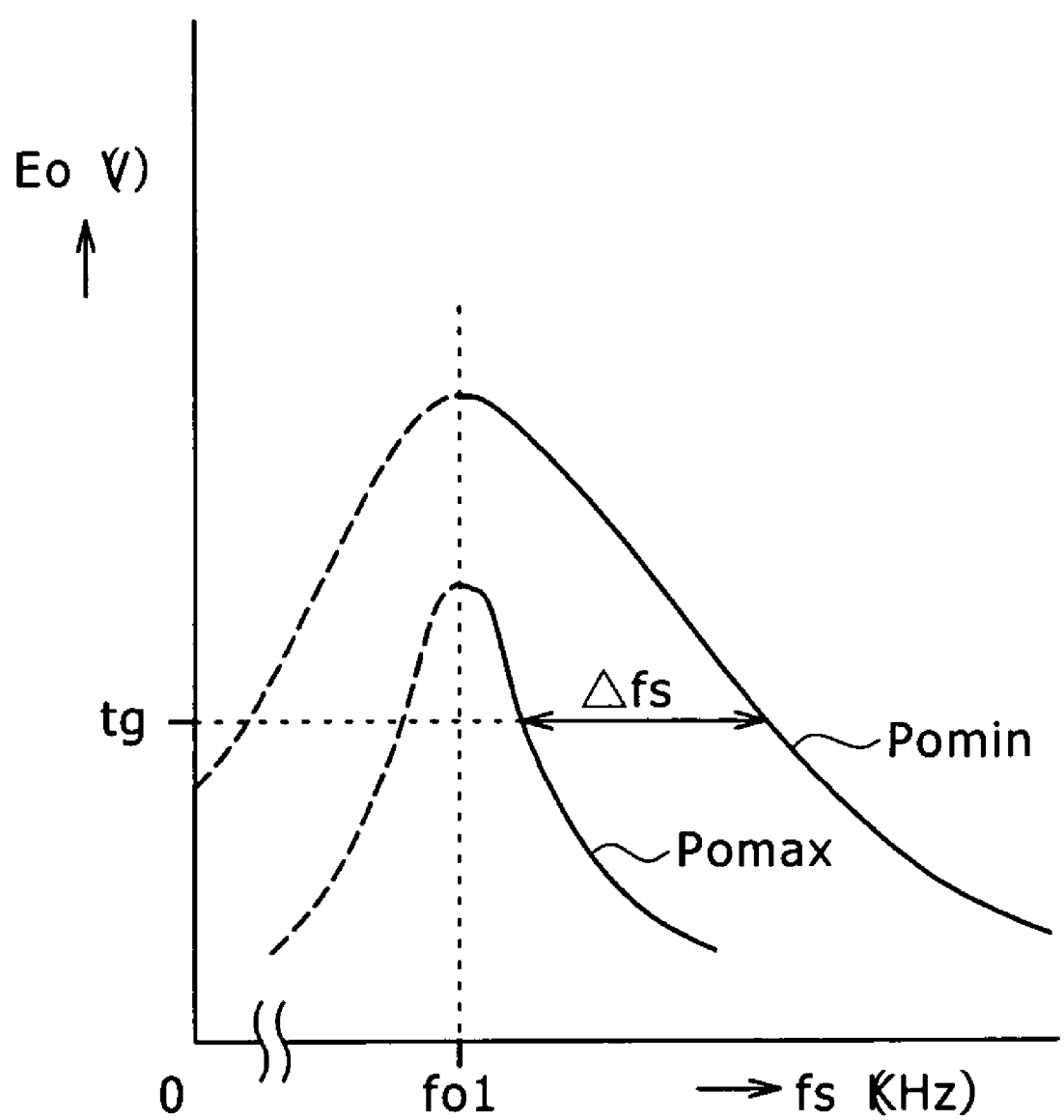
FIG. 18 is a diagram showing constant-voltage control characteristics of the power supply circuit shown in FIG. 16.

An actual comparison between the unimodal characteristic shown in FIG. 4 and the constant-voltage control characteristic shown in FIG. 18 of the complex resonant converter of the prior art power supply circuit (FIG. 16) indicates that the characteristic shown in FIG. 18 has a considerably gentler slope as a quadratic function curve as compared with the unimodal characteristic shown in FIG. 4.

Since the power supply circuit shown in FIG. 16 has a gentle curve as the characteristic shown in FIG. 18 as described above, a necessary range for controlling the switching frequency fs to perform constant-voltage control on the secondary side direct-current output voltage Eo is Δfs=about 100 kHz or more with fs=about 80 kHz to about 200 kHz or higher even under a condition of a single range, for example.

It is therefore very difficult for the power supply circuit shown in FIG. 16 to be ready for a wide range by only constant-voltage control by switching frequency control, as described above.

Figure 5:
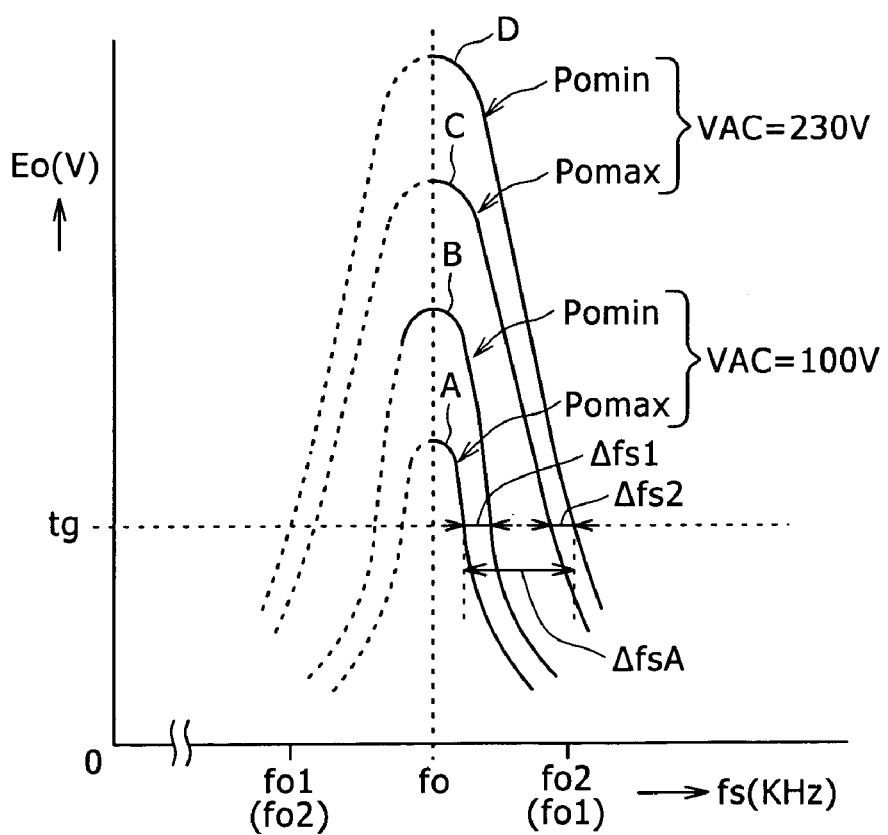
FIG. 5 is a diagram showing switching frequency control ranges (necessary control ranges) corresponding to alternating input voltage conditions and load variations, as constant-voltage control operations of the power supply circuit according to the embodiment.

On the other hand, the constant-voltage control characteristic of the first embodiment is the unimodal characteristic represented by the characteristic curve 3 in FIG. 4, and thus constant-voltage control operations of the first embodiment are as shown in FIG. 5.

FIG. 5 shows four characteristic curves of the power supply circuit according to the first embodiment shown in FIG. 1, that is, characteristic curves A and B at the time of maximum load power (Pomax) and at the time of minimum load power (Pomin), respectively, when the alternating input voltage VAC=100 V (AC 100 V system) and characteristic curves C and D at the time of maximum load power (Pomax) and at the time of minimum load power (Pomin), respectively, when the alternating input voltage VAC=230 V (AC 200 V system).

As is clear from FIG. 5, Δfs1 denotes the variable control range (necessary control range) of the switching frequency which range is necessary to hold the secondary side direct-current output voltage Eo constant at a required rated level tg when the alternating input voltage VAC=100 V corresponding to the input of the AC 100 V system. That is, the variable control range (necessary control range) of the switching frequency is a frequency range from the switching frequency fs at the level tg in the characteristic curve A to the switching frequency fs at the level tg in the characteristic curve B.

In addition, Δfs2 denotes the variable control range (necessary control range) of the switching frequency which range is necessary to hold the secondary side direct-current output voltage Eo constant at the required rated level tg when the alternating input voltage VAC=230 V corresponding to the input of the AC 200 V system. That is, the variable control range (necessary control range) of the switching frequency is a frequency range from the switching frequency fs at the level tg in the characteristic curve C to the switching frequency fs at the level tg in the characteristic curve D.

As described above, the unimodal characteristic as the characteristic of control of the secondary side direct-current output voltage Eo in the first embodiment has a considerably steeper slope as a quadratic function curve than the control characteristic shown in FIG. 18.

Therefore the above-described necessary control ranges Δfs1 and Δfs2 when the alternating input voltage VAC=100 V and 230 V are considerably reduced as compared with Δfs shown in FIG. 18. For example, results of actual measurements show that the actually measured necessary control ranges Δfs1 and Δfs2 are reduced to about 1/10 or less of the actual range Δfs shown in FIG. 18.

A frequency variable range (ΔfsA) from the lowest switching frequency in Δfs1 (the switching frequency fs at the level tg in the characteristic curve A) to the highest switching frequency in Δfs2 (the switching frequency fs at the level tg in the characteristic curve D) is correspondingly narrowed.

The actual frequency variable range ΔfsA in the power supply circuit according to the first embodiment shown in FIG. 1 easily falls within the variable range of the switching frequency dealt with by the switching-driving IC (oscillation and drive circuit 2) in the present situation. That is, the power supply circuit shown in FIG. 1 can actually control the switching frequency variably in the frequency variable range ΔfsA. This means that the power supply circuit shown in FIG. 1 can stabilize the secondary side direct-current output voltage Eo while dealing with the commercial alternating-current power supply input of either of the AC 100 V system and the AC 200 V system. That is, the power supply circuit shown in FIG. 1 achieves a wide range capability by only switching frequency control.

Incidentally, an electromagnetic coupling type resonant circuit is already known as a technique for expanding an amplification bandwidth of an amplifier circuit formed by a transistor in communication technology as in an intermediate-frequency transformer amplifier, for example. In such a field, however, a bimodal characteristic in close coupling or a flat characteristic in critical coupling is used, but a unimodal characteristic in loose coupling is not used. It can be said that in the techniques of such an electromagnetic coupling type resonant circuit, the unimodal characteristic in loose coupling that has not been used in the field of communication technology is aggressively used in the first embodiment in a field of resonant switching converters. Thereby, as described above, the variable range (necessary control range) of the switching frequency which range is necessary to stabilize the secondary side direct-current output voltage Eo is reduced, and a wide range capability can be achieved by only constant-voltage control by switching frequency control.

Incidentally, in general, as the degree of loose coupling between the primary side and the secondary side of the isolated converter transformer PIT is increased, a power loss in the isolated converter transformer PIT tends to increase, and power conversion efficiency is correspondingly decreased. However, the first embodiment provides a practically sufficient power conversion efficiency characteristic as later described. This is because a series resonant circuit (the secondary side series resonant circuit) is formed also on the secondary side.

That is, the secondary side series resonant circuit makes it possible to supply power as the secondary side direct-current output voltage Eo including an energy increase obtained by resonant operation of the secondary side series resonant circuit, thus compensating for the decrease in the efficiency due to loose coupling.

As described with reference to FIG. 1, in the power supply circuit according to the first embodiment, the secondary winding N2A and the secondary winding N2B are wound as the secondary winding N2, and the secondary side direct-current output voltage +Eo and the secondary side direct-current output voltage −Eo having the same positive and negative levels are generated on the basis of the respective outputs of the secondary winding N2A and the secondary winding N2B.

In the circuit of FIG. 16 that similarly generates the secondary side direct-current output voltage +Eo and the secondary side direct-current output voltage −Eo having the same positive and negative levels, voltage variations (cross regulation) occur in the secondary side direct-current output voltage −Eo that is not subjected to constant-voltage control. On the other hand, by employing the above-described configuration of the embodiment ready for a wide range, such cross regulation can be improved.

Specifically, the embodiment has a series resonant circuit at least on a side where the direct-current output voltage to be supplied also as detection input for constant-voltage control is generated, whereby the necessary control range of the switching frequency which range is necessary for stabilization can be reduced, as described above.

This also suppresses the increase in the switching frequency at a light load which increase has been a conventional problem, and correspondingly suppresses a variation in the secondary side direct-current output voltage −Eo which variation accompanies such a change in the primary side switching frequency. Thus, because of this first point, cross regulation is improved as compared with the conventional circuit.

In addition, according to the configuration shown in FIG. 1, a secondary side series resonant circuit is formed in a system for generating the secondary side direct-current output voltage −Eo. This makes it possible to eliminate an effect of one-sidedness of lines of magnetic force occurring between the secondary winding N2A and the secondary winding N2B in the conventional circuit of FIG. 16. That is, the configuration of FIG. 1 can equalize the level of the alternating voltage induced in the secondary winding N2A with the level of the alternating voltage induced in the secondary winding N2B.

This can be understood from the fact that a rectification current I1 flowing on the secondary winding N2A side and a rectification current I2 flowing on the secondary winding N2B side have the same peak level, as will be described later with reference to waveform charts of FIG. 6 and FIG. 7.

Since an imbalance between the levels of the rectification currents flowing through the respective windings is thus eliminated, an imbalance between the levels of charging currents to the respective capacitors (CoA and CoB) on the secondary side in each half period as in the circuit shown in FIG. 16 can be eliminated.

That is, constant-voltage control operation in this case can produce substantially the same effects on the secondary winding N2A side and the secondary winding N2B side. Also because of this point, the circuit shown in FIG. 1 improves cross regulation.

Incidentally, reasons that the levels of the alternating voltages induced in the secondary winding N2A and the secondary winding N2B are equalized with each other by forming the secondary side series resonant circuit also in the system for generating the secondary side direct-current output voltage −Eo as described above can be considered as follows.

In this case, the same number of turns (inductance) as that of the secondary winding N2A is set to the secondary winding N2B, and the secondary side series resonant capacitor C2B having the same capacitance as the secondary side series resonant capacitor C2A is connected. Thus, the resonant circuit on the secondary winding N2A side and the resonant circuit on the secondary winding N2B side perform the same resonant operation. The resonant circuits on the primary side and the secondary side are coupled to each other. Thus, as for the levels of the alternating voltages obtained in the secondary windings, effects of the resonant operation are dominant over effects of magnetic coupling, and consequently substantially the same level of alternating voltage is obtained on the secondary winding N2A side and the secondary winding N2B side.

Figure 6:
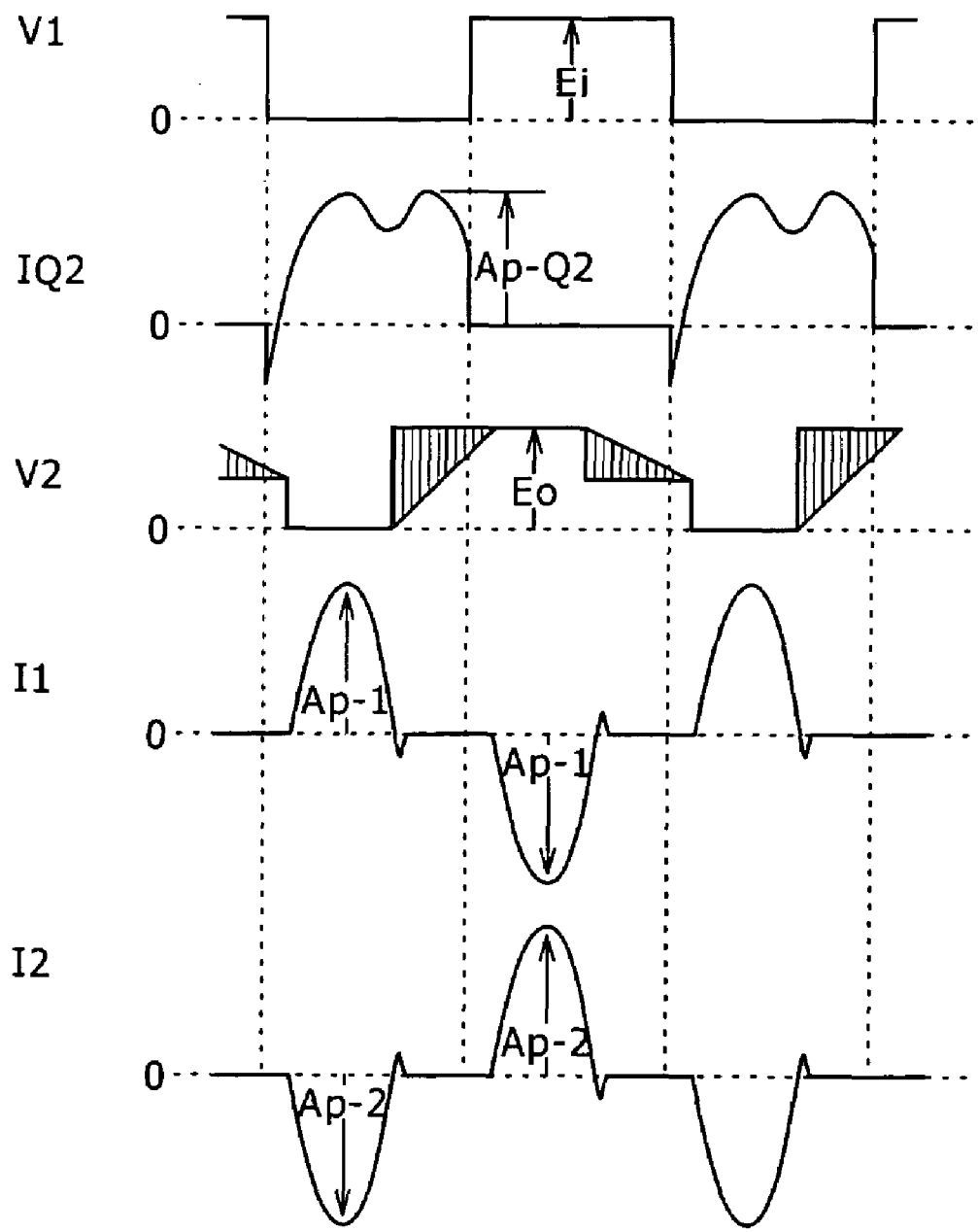
FIG. 6 is a waveform chart showing operating waveforms of principal parts at the time of AC 100 V in the power supply circuit according to the embodiment.
Figure 7:
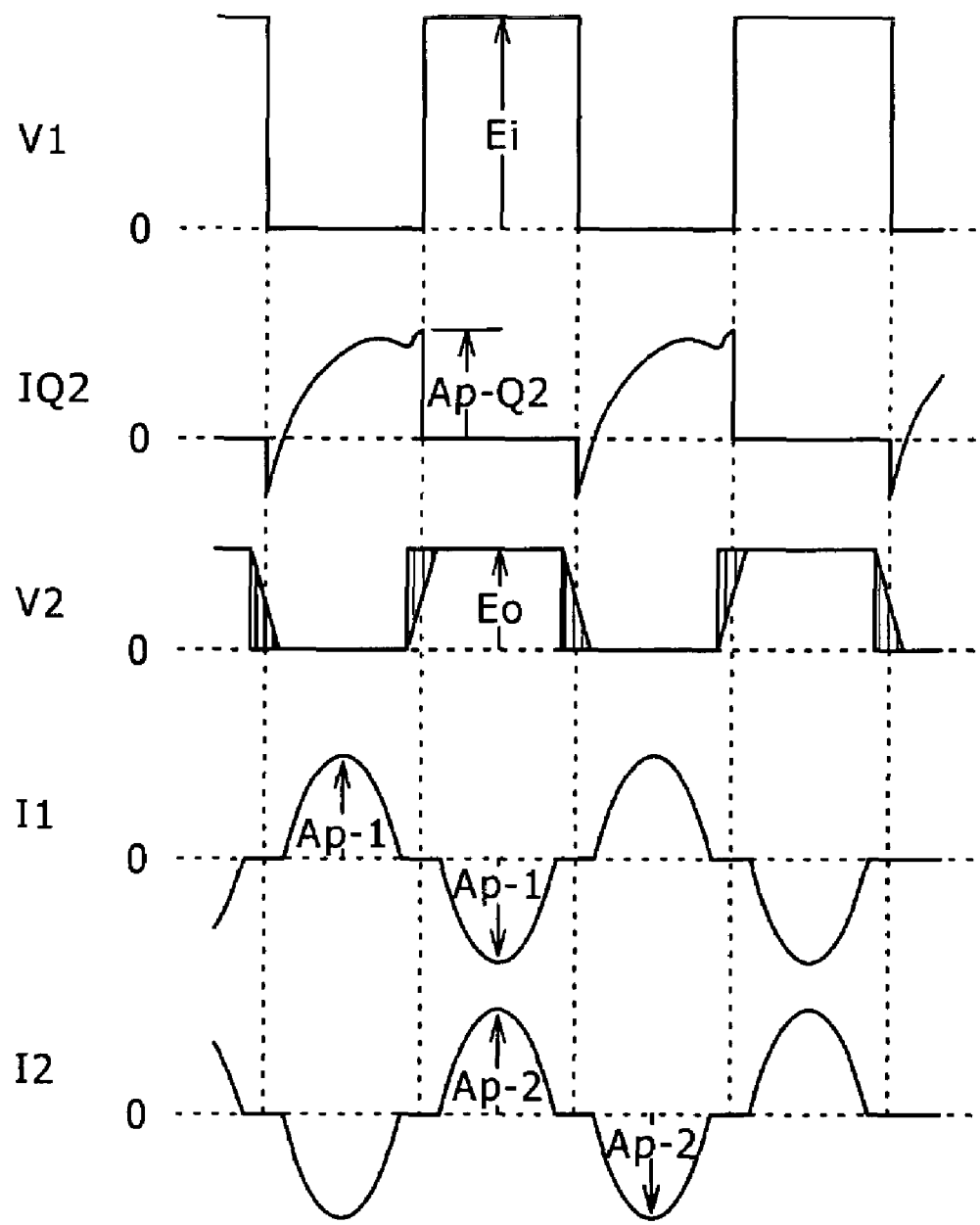
FIG. 7 is a waveform chart showing operating waveforms of the principal parts at the time of AC 230 V in the power supply circuit according to the embodiment.

FIG. 6 and FIG. 7 are waveform charts of operation of principal parts of the circuit shown in FIG. 1.

Of these figures, FIG. 6 shows operating waveforms when the alternating input voltage VAC=100 V, and FIG. 7 shows operating waveforms when the alternating input voltage VAC=230 V. These figures show experimental results when load power Po was held constant at 150 W (secondary side direct-current output voltage ±Eo=30 V).

In obtaining the results shown in FIG. 6 and FIG. 7, principal parts of the power supply circuit shown in FIG. 1 were selected as follows.

As for the isolated converter transformer PIT, the gap length of the gap G in the EE type core was set to 2.4 mm, and as the numbers of turns of the primary winding and the secondary windings, N1=37 T, and N2A=N2B=6 T. By this structure, k=about 0.65 is obtained as the coupling coefficient k of the isolated converter transformer PIT itself.

The resonant capacitors for forming the primary side series resonant circuit, the secondary side series resonant circuits, and the primary side partial voltage resonant circuit were selected as follows.

Primary side series resonant capacitor C1=0.033 µF
Primary side partial resonant capacitor Cp=1000 pF
Secondary side series resonant capacitor C2A=secondary side series resonant capacitor C2B=1.2 µF Incidentally, the parts are thus set to meet conditions of maximum load power Pomax=150 W or lower, the secondary side direct-current output voltage ±Eo=35 V or lower, and the load current=10 A or lower.

A voltage V1 in the form of a rectangular wave in FIG. 6 and FIG. 7 is a voltage across the switching device Q2, and indicates on/off timing of the switching device Q2.

The voltage V1 has a waveform such that the voltage V1 is at a zero level during an on period during which the switching device Q2 conducts and is in an on state and the voltage V1 is clamped at the level of the rectified and smoothed voltage Ei during an off period during which the switching device Q2 does not conduct.

During the on period of the switching device Q2, a switching current IQ2 having a waveform as shown in the figure flows in a switching circuit system including the switching device Q2 and the clamping diode DD2. The switching current IQ2 is at a zero level during the off period of the switching device Q2.

Though not shown in the figure, a voltage across the other switching device Q1 and a switching current flowing through a switching circuit (Q1 and DD1) have waveforms obtained by shifting the phases of the voltage V1 and the switching current IQ2 180°. That is, the switching device Q1 and the switching device Q2 perform switching operation so as to be turned on/off alternately in the same periodic timing.

Incidentally, a primary side series resonance current Io flowing through the primary side series resonant circuit (L1-C1) flows as a component obtained by combining the switching currents flowing through the switching circuits (Q1 and DD1) and (Q2 and DD2) with each other.

A result obtained shows that the peak level Ap-Q2 of the switching current IQ2 is 4.2 Ap when the alternating input voltage VAC=100 V in FIG. 6. The peak level Ap-Q2 of the switching current IQ2 is 3.5 Ap when the alternating input voltage VAC=230 V in FIG. 7.

In response to the flow of the above-mentioned primary side series resonance current Io, an alternating voltage V2 having a waveform as shown in the figure is induced in the secondary winding N2B (and on the secondary winding N2A side) wound on the secondary side of the isolated converter transformer PIT. The length of one period of the alternating voltage V2 corresponds to a switching period on the primary side. The peak level of the alternating voltage V2 is clamped substantially at the level of the secondary side direct-current output voltage Eo, as shown in the figure.

In one half period of the alternating voltage V2, as described above, the rectifier diodes Do1A and Do4A conduct in the rectifier circuit on the secondary winding N2A side, and the rectifier diodes Do2B and Do3B conduct on the secondary winding N2B side. In the other half period of the alternating voltage V2, the rectifier diodes Do2A and Do3A and the rectifier diodes Do4B and Do1B conduct, and thus rectification currents flow.

The rectification current I1 flowing on the secondary winding N2A side and the rectification current I2 flowing on the secondary winding N2B side have waveforms as shown in the figure.

An experimental result obtained shows that the peak level Ap-1 of the rectification current I1 and the peak level Ap-2 of the rectification current I2 in the circuit shown in FIG. 1 are both 6 Ap when the alternating input voltage VAC=100 V as shown in FIG. 6. Another experimental result obtained shows that the peak level Ap-1 and the peak level Ap-2 are both the same level of 4.5 Ap when the alternating input voltage VAC=230 V as shown in FIG. 7.

Figure 8:
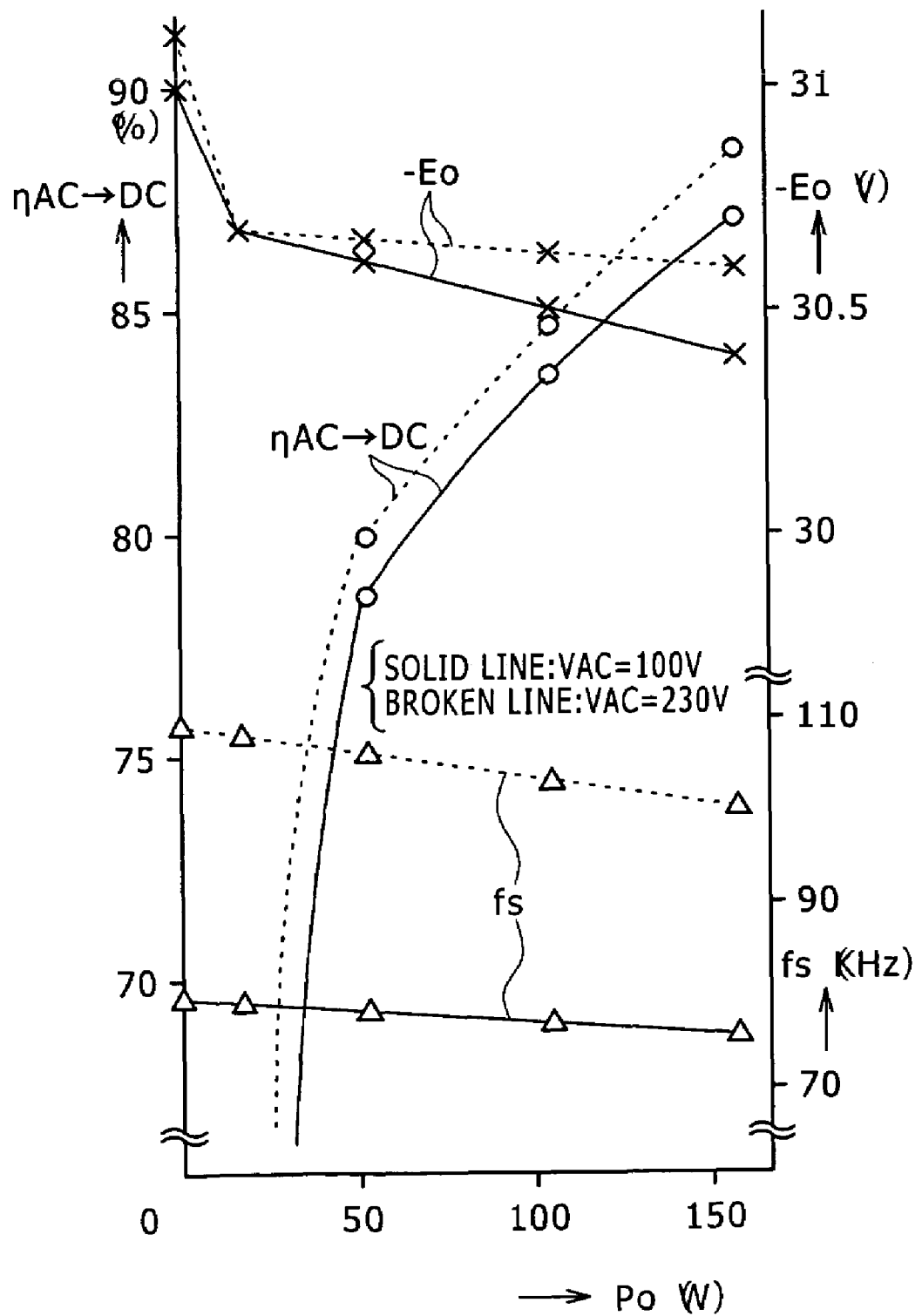
FIG. 8 is a characteristic diagram showing characteristics of power conversion efficiency, switching frequency, and cross regulation with respect to load variation in the power supply circuit according to the first embodiment.

FIG. 8 shows a characteristic of variation of the switching frequency fs, a characteristic of variation of AC→DC power conversion efficiency (ηAC→DC), and a characteristic of variation of the secondary side direct-current output voltage –Eo (cross regulation characteristic) with respect to load variation in a range of maximum load power Pomax=150 W to minimum load power Pomin=0 W (no load) as results of an experiment on the power supply circuit shown in FIG. 1. In this figure, characteristics at the time of the alternating input voltage VAC=100 V corresponding to the AC 100 V system are represented by solid lines, and characteristics at the time of the alternating input voltage VAC=230 V corresponding to the AC 200 V system are represented by broken lines.

Incidentally, in obtaining the characteristics shown in FIG. 8, parts were selected to be the same as those described with reference to FIG. 6 and FIG. 7.

The AC→DC power conversion efficiency (ηAC→DC) in FIG. 8 is increased as the load power Po is increased. Measurement results show that under the load condition of the maximum load power Po=150 W, the AC→DC power conversion efficiency ηAC→DC=87.5% when the alternating input voltage VAC=100 V and the AC→DC power conversion efficiency ηAC→DC=89.0% when the alternating input voltage VAC=230 V.

The switching frequency fs is decreased as the load becomes heavier. When the alternating input voltage VAC=100 V, a variation range Δfs of the switching frequency fs with respect to the variation of the load power Po=150 W to 0 W is 2.9 kHz. Therefore the necessary control range in the single range of the 100 V system is about 3 kHz.

When the alternating input voltage VAC=230 V, the variation range Δfs of the switching frequency fs with respect to the same load variation is 8.7 kHz. Therefore the necessary control range in the single range of the 200 V system is about 9 kHz.

It is understood also from these experimental results that the configuration of FIG. 1 greatly reduces the necessary control range of the switching frequency.

The secondary side direct-current output voltage –Eo is lowered as the load becomes heavier, as shown in the figure.

A result obtained shows that when the alternating input voltage VAC=100 V, a variation range Δ–Eo of the secondary side direct-current output voltage –Eo with respect to the variation of the load power Po=150 W to 0 W is 0.6 V. Another result obtained shows that when the alternating input voltage VAC=230 V, the variation range Δ–Eo with respect to the same load variation is 0.5 V.

These variation ranges are narrower than the variation range Δ–Eo=1.0 V in the case of the conventional circuit shown in FIG. 16. That is, the circuit of FIG. 1 improves cross regulation as compared with the circuit of FIG. 16.

As described thus far, the power supply circuit according to the first embodiment shown in FIG. 1 achieves a wide range capability by only switching frequency control.

Thus, in achieving the wide range capability, for example, it is not necessary to change rectifying operation in a rectifier circuit system for generating the direct-current input voltage (Ei) according to the rated level of the commercial alternating-current power, or employ a configuration in which a switching converter type is switched between a half-bridge coupling system and a full-bridge coupling system.

When the need for the configurations for such circuit switching is eliminated, it is possible, for example, to use only one smoothing capacitor Ci and use only two switching devices at least necessary for half-bridge coupling. Thus, corresponding reductions in the number of circuit components, the scale of the circuit, switching noise and the like are achieved.

In addition, when the need for the circuit switching configurations is eliminated, it is not necessary to provide a special configuration to prevent erroneous operation due to circuit switching. This also prevents an increase in the number of components and an increase in cost. Further, since a standby power supply for preventing the erroneous operation is not essential, a range of apparatuses in which the power supply circuit is usable can be widened.

In obtaining effects of such an embodiment, a minimum required as parts to be added to the configuration of the conventional current resonant converter having a series resonant circuit only on the primary side is only the secondary side series resonant capacitors. That is, the wide range capability can be achieved by adding a much smaller number of parts than when the configuration of the conventional circuit switching system is employed.

In addition, the substantial reduction of the necessary control range Δfs of the switching frequency as described above greatly improves constant-voltage control response regardless of whether the power supply circuit has a wide range capability or a single range capability.

Specifically, some electronic devices perform operation that varies the load power Po in such a manner as to change (switch) relatively rapidly between a maximum load and no load. Such a load variation is referred to as a switching load. Devices that perform such a switching load operation include for example a printer as a peripheral device for a personal computer.

When a power supply circuit having a relatively wide necessary control range Δfs as shown in FIG. 16, for example, is included in a device performing such a switching load operation, the switching frequency fs is changed by a correspondingly large amount of change following an abrupt change in load power, as described above. It is therefore difficult to obtain quick constant-voltage control response.

On the other hand, the first embodiment greatly reduces the necessary control range Δfs in a region of each single range, in particular, as is clear from the foregoing characteristic diagram, and is therefore able to stabilize the secondary side direct-current output voltage Eo by quickly responding to an abrupt variation in the load power Po between a maximum load and no load. That is, the constant-voltage control response to the switching load can be greatly improved.

The configuration of a modification of the first embodiment will next be described with reference to a circuit diagram of FIG. 9.

Figure 9:
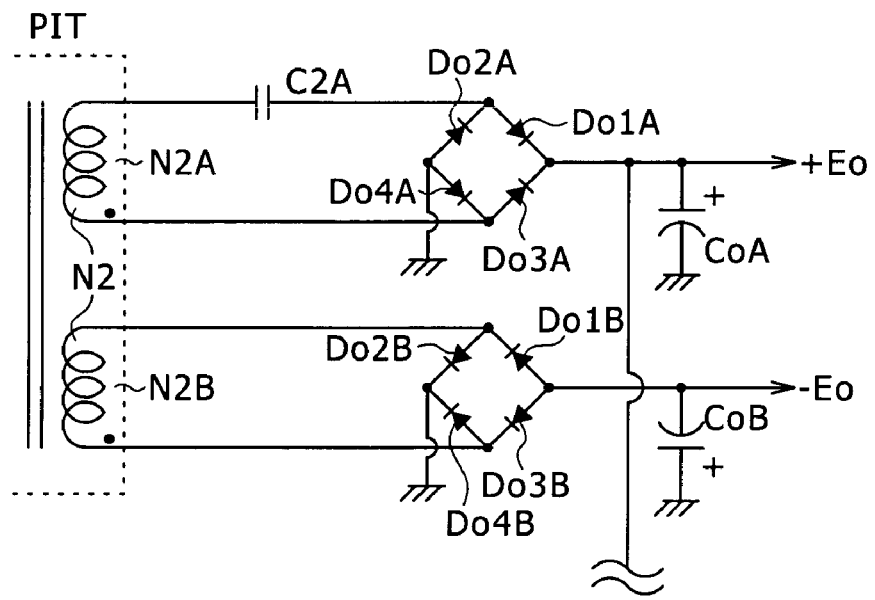
FIG. 9 is a circuit diagram showing the configuration of a power supply circuit as a modification of the first embodiment.

Incidentally, while FIG. 9 shows only a configuration on a secondary side of a power supply circuit, a configuration used on a primary side is the same configuration as shown in FIG. 1. In FIG. 9, parts similar to the parts already described with reference to FIG. 1 are identified by the same reference numerals, and description thereof will be omitted.

In the modification shown in FIG. 9, the secondary side series resonant capacitor C2B connected in series with the secondary winding N2B in the circuit of FIG. 1 is omitted, as shown in the figure.

When a secondary side series resonant circuit is formed in at least a system for generating a secondary side direct-current output voltage +Eo subjected to constant-voltage control, and the coupling coefficient of an isolated converter transformer PIT is set to the same value as in the case of FIG. 1, the configuration of such a modification can reduce the variable control range of switching frequency which range is necessary for stabilization as in the case of FIG. 1.

That is, the configuration shown in FIG. 9 can be configured to have a wide rage capability as in the case of FIG. 1, and obtain effects attendant on the wide rage capability which effects are similar to those of FIG. 1.

In this case, however, since no series resonant circuit is formed on a secondary winding N2B, an effect of one-sidedness of lines of magnetic force occurs between a secondary winding N2A and a secondary winding N2B. That is, an imbalance occurs between the peak levels of rectification currents flowing on the respective secondary winding N2 sides. This does not improve cross regulation, unlike the case of FIG. 1.

However, in this case, as in the case of FIG. 1, the necessary control range of switching frequency is reduced, as described above. This improves cross regulation. That is, cross regulation is improved as compared with the circuit of FIG. 16.

Further, in this case, since one secondary side series resonant capacitor C2B can be omitted, it is possible to correspondingly reduce the number of circuit component parts and reduce manufacturing cost.

Figure 10:
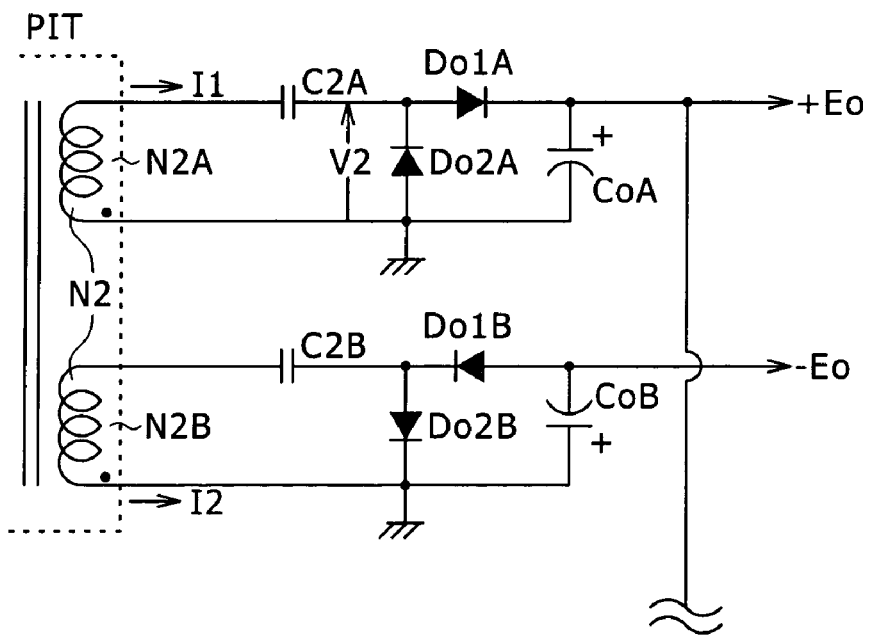
FIG. 10 is a circuit diagram showing an example of configuration of a power supply circuit according to a second embodiment.

FIG. 10 shows an example of configuration of a power supply circuit according to a second embodiment of the present invention.

The power supply circuit according to the second embodiment has a voltage doubler half-wave rectifier circuit formed as each rectifier circuit on a secondary side.

Incidentally, while FIG. 10 also shows only a configuration on the secondary side of the power supply circuit, a configuration used on a primary side is the same configuration as shown in FIG. 1. Also in FIG. 10, parts described with reference to FIG. 1 are identified by the same reference numerals, and description thereof will be omitted.

As with the circuit shown in FIG. 1, the circuit shown in FIG. 10 meets the condition of load power Po=150 W to 0 W (secondary side direct-current output voltage ±Eo=35 V or lower and load current=10 A or lower).

On the secondary winding N2A side of the voltage doubler half-wave rectifier circuits, one end part (winding termination end part) of the secondary winding N2A is connected to the anode of a rectifier diode Do1A via the series connection of a secondary side series resonant capacitor C2A. The cathode of the rectifier diode Do1A is connected to the positive electrode terminal of a smoothing capacitor CoA. The negative electrode terminal of the smoothing capacitor CoA is connected to a secondary side ground.

The other end part (winding start end part) of the secondary winding N2A is also connected to the secondary side ground. In addition, a rectifier diode Do2A is inserted between a point of connection between the other end part of the secondary winding N2A and the secondary side ground and a point of connection between the secondary side series resonant capacitor C2A and the anode of the rectifier diode Do1A as shown in the figure. That is, the rectifier diode Do2A is connected in parallel with the secondary winding N2A.

In this case, the rectifier diode Do2A is inserted such that the cathode side of the rectifier diode Do2A is connected to the point of connection between the secondary side series resonant capacitor C2A and the anode of the rectifier diode Do1A.

On the other secondary winding N2B side of the voltage doubler half-wave rectifier circuits, the cathode of a rectifier diode Do1B is connected to one end part (winding termination end part) of the secondary winding N2B via the series connection of a secondary side series resonant capacitor C2B. The anode side of the rectifier diode Do1B is connected to the negative electrode terminal of a smoothing capacitor CoB. The positive electrode terminal side of the smoothing capacitor CoB is connected to the secondary side ground.

The other end part (winding start end part) of the secondary winding N2B is connected to the secondary side ground also in this case. In addition, a rectifier diode Do2B is inserted between a point of connection between the other end part of the secondary winding N2B and the secondary side ground and a point of connection between the secondary side series resonant capacitor C2B and the anode of the rectifier diode Do1B. Thus, also in this case, the rectifier diode Do2B is connected in parallel with the secondary winding N2B.

The anode side of the rectifier diode Do2B is connected to the point of connection between the secondary side series resonant capacitor C2B and the cathode of the rectifier diode Do1B.

In such a connection mode, also in this case, a secondary side direct-current output voltage +Eo of positive polarity is obtained at the smoothing capacitor CoA, and a secondary side direct-current output voltage −Eo of negative polarity is obtained at the smoothing capacitor CoB. Incidentally, also in this case, the secondary side direct-current output voltage +Eo branches off to be supplied as a detection input to a control circuit 1.

As for rectifying operation in this case, on the secondary winding N2A side, the rectifier diode Do2A connected in parallel with the secondary winding N2A conducts in one half period of an alternating voltage. A rectification current flows via the secondary winding N2A, the rectifier diode Do2A, and the secondary side series resonant capacitor C2A in that order. That is, in this period, the secondary side series resonant capacitor C2A is charged with the secondary side rectification current. Thereby a voltage having a level corresponding to once the level of the alternating voltage induced in the secondary winding N2A is generated across the secondary side series resonant capacitor C2A.

In the other half period, the rectifier diode Do1A conducts. A rectification current flows via the secondary winding N2A, the secondary side series resonant capacitor C2A, the rectifier diode Do1A, and the smoothing capacitor CoA in that order to charge the smoothing capacitor CoA. That is, the rectifier diode Do1A in this period performs rectifying operation on an alternating voltage on which the voltage obtained across the secondary side series resonant capacitor C2A as described above is superimposed. Thereby the secondary side direct-current output voltage +Eo having a level corresponding to twice the level of the alternating voltage occurring in the secondary winding N2A is generated across the smoothing capacitor CoA.

On the secondary winding N2B side, the rectifier diode Do2B connected in parallel with the secondary winding N2B conducts in the one half period. A rectification current flows via the secondary winding N2B, the secondary side series resonant capacitor C2B, and the rectifier diode Do2B in that order. That is, in this period, a voltage having a level corresponding to once the level of the alternating voltage induced in the secondary winding N2B is generated across the secondary side series resonant capacitor C2B.

In the other half period, the rectifier diode Do1B conducts. A rectification current flows via the secondary winding N2B, the rectifier diode Do1B, the smoothing capacitor CoB, the rectifier diode Do1B, and the secondary side series resonant capacitor C2B in that order to charge the smoothing capacitor CoB. That is, the secondary side direct-current output voltage −Eo having a level corresponding to twice the level of the alternating voltage occurring in the secondary winding N2B is thereby generated across the smoothing capacitor CoB.

Thus, each rectifying and smoothing circuit on the secondary side of the circuit shown in FIG. 10 performs a voltage doubler half-wave rectifier operation in which the smoothing capacitor Co is charged only in one half period of the alternating voltage induced in the secondary winding N2 and the level corresponding to twice the level of the alternating voltage is obtained as voltage level (absolute value) across the smoothing capacitor Co.

Figure 11:
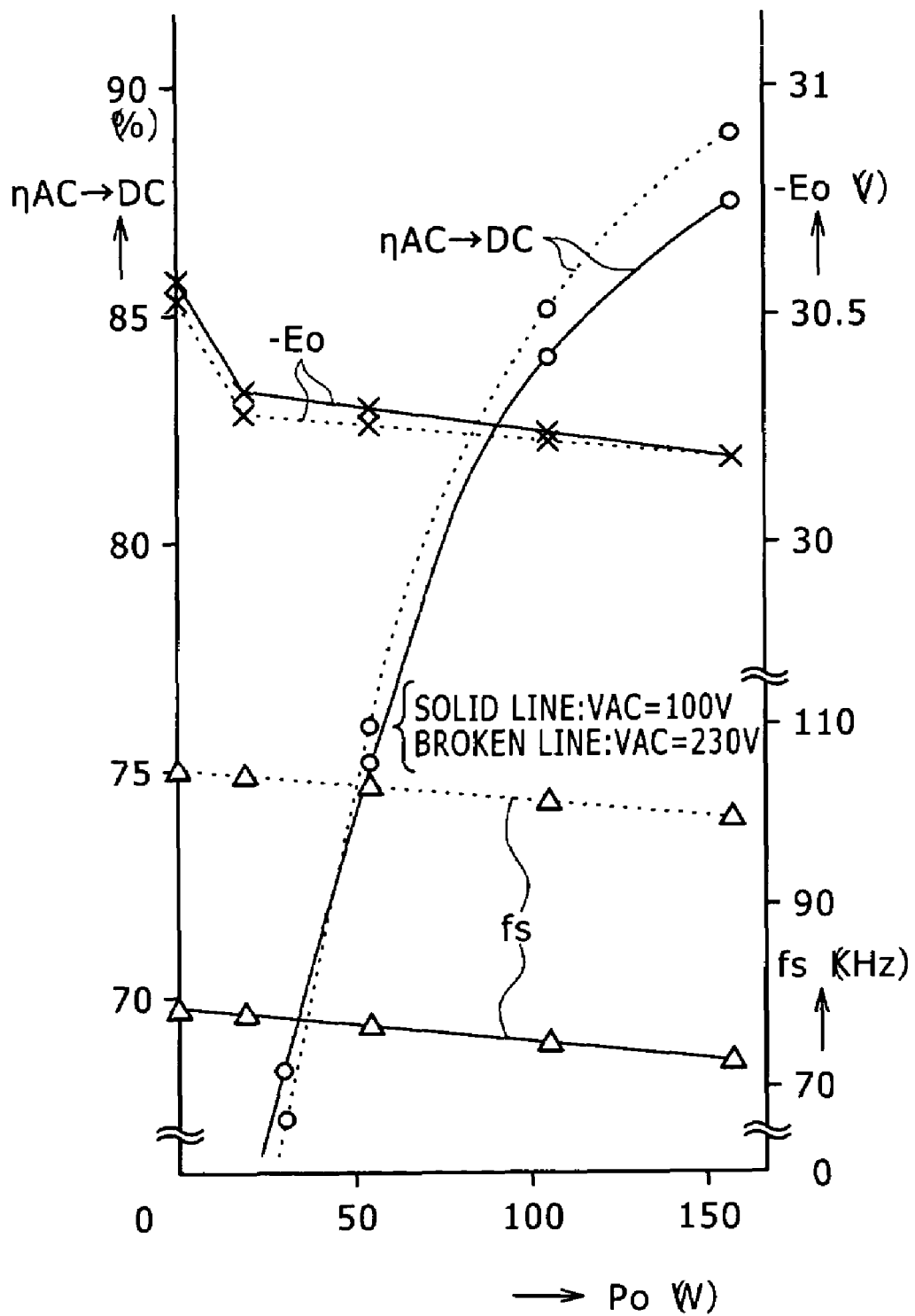
FIG. 11 is a characteristic diagram showing characteristics of power conversion efficiency, switching frequency, and cross regulation with respect to load variation in the power supply circuit according to the second embodiment.

FIG. 11 shows characteristics of switching frequency fs, AC→DC power conversion efficiency ($\eta$AC→DC), and cross regulation (variation of the secondary side direct-current output voltage −Eo) with respect to load variation in a range of maximum load power Pomax=150 W to minimum load power Pomin=0 W (no load) in the circuit according to the second embodiment shown in FIG. 10. Also in this figure, characteristics at the time of the alternating input voltage VAC=100 V corresponding to the AC 100 V system are represented by solid lines, and characteristics at the time of the alternating input voltage VAC=230 V corresponding to the AC 200 V system are represented by broken lines.

Incidentally, in obtaining the characteristics shown in FIG. 11, parts of the circuit of FIG. 10 were selected as follows.

Isolated converter transformer PIT: gap G=2.4 mm, and coupling coefficient k=0.65
Primary winding N1=30 T
Secondary winding N2A=secondary winding N2B=3 T
Primary side series resonant capacitor C1=0.047 µF
Primary side partial resonant capacitor Cp=1000 pF
Secondary side series resonant capacitor C2A=C2B=1.2 µF As is understood from such selected conditions, in the second embodiment, as in the power supply circuit according to the first embodiment shown in FIG. 1, the gap G formed in the inner magnetic leg of a core in the isolated converter transformer PIT is set to about 2.4 mm to obtain a coupling coefficient k=0.65.

In addition, also in this case, a secondary side series resonant circuit is formed in at least a system for generating a secondary side direct-current output voltage subjected to constant-voltage control. Thus, as in the case of FIG. 1, the necessary control range of switching frequency is reduced.

Also in this case, the AC→DC power conversion efficiency ($\eta$AC→DC) in FIG. 11 is increased as the load power Po is increased. Measurement results show that under the load condition of the maximum load power Po=150 W, the AC→DC power conversion efficiency $\eta$AC→DC=88.0% when the alternating input voltage VAC=100 V and the AC→DC power conversion efficiency $\eta$AC→DC=89.55% when the alternating input voltage VAC=230 V.

The switching frequency fs is decreased as the load becomes heavier. When the alternating input voltage VAC=100 V, a variation range $\Delta$fs of the switching frequency fs with respect to the variation of the load power Po=150 W to 0 W is 4.6 kHz. Therefore the necessary control range in the single range of the 100 V system is about 5 kHz.

When the alternating input voltage VAC=230 V, the variation range $\Delta$fs of the switching frequency fs with respect to the same load variation is 6.7 kHz. Therefore the necessary control range in the single range of the 200 V system is about 7 kHz.

It is understood also from these experimental results that the configuration of FIG. 10 greatly reduces the necessary control range of the switching frequency in each single range.

That is, as in the case of the first embodiment, the second embodiment improves high-speed transient response characteristics.

Also in this case, the secondary side direct-current output voltage −Eo is lowered as the load becomes heavier, as shown in the figure.

A result obtained shows that when the alternating input voltage VAC=100 V, a variation range $\Delta$−Eo of the secondary side direct-current output voltage −Eo with respect to the variation of the load power Po=150 W to 0 W is 0.6 V, which is half that of the first embodiment.

Another result obtained shows that when the alternating input voltage VAC=230 V, the variation range Δ–Eo with respect to the same load variation is 0.4 V.

It is understood also from the results that the circuit of FIG. 10 improves cross regulation.

Incidentally, an obtained result of an experiment on the power supply circuit according to the second embodiment shows that the peak level Ap-1 of the rectification current I1 and the peak level Ap-2 of the rectification current I2 shown in FIG. 10 are both the same level of 12 Ap under the condition of the alternating input voltage VAC=100 V when the load power Po=150 W.

Another result obtained shows that the peak level Ap-1 and the peak level Ap-2 are the same level of 9 Ap under the condition of the alternating input voltage VAC=230 V.

Another result obtained shows that under the same condition of the load power Po=150 W, the peak level Ap-Q2 of a switching current IQ2 is 3.6 Ap when the alternating input voltage VAC=100 V and the peak level Ap-Q2 of the switching current IQ2 is 3.1 Ap when the alternating input voltage VAC=230 V.

Figure 12:
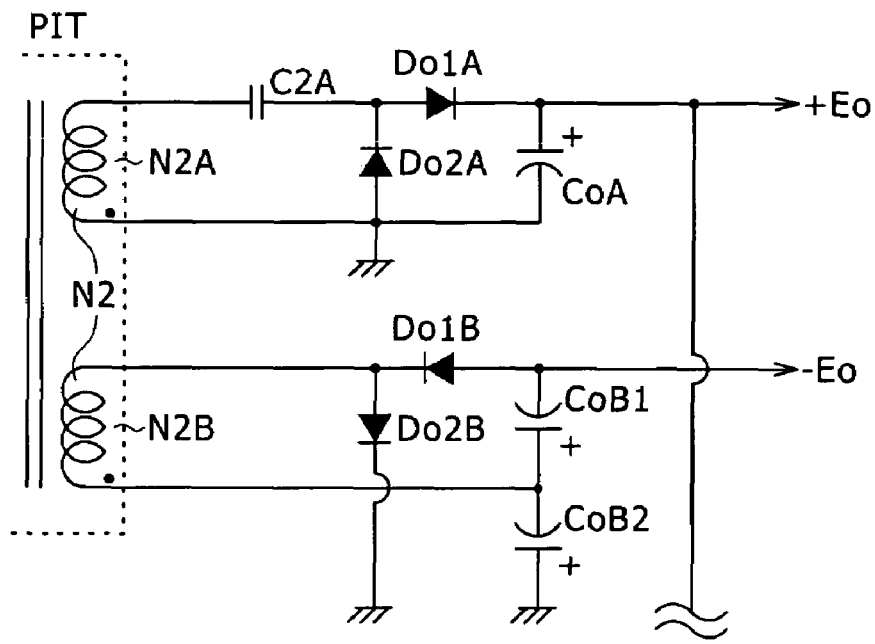
FIG. 12 is a circuit diagram showing the configuration of a power supply circuit as a modification of the second embodiment.

A circuit diagram of FIG. 12 shows a modification of the second embodiment.

Incidentally, while FIG. 12 also shows only a configuration on a secondary side of a power supply circuit, a configuration used on a primary side is the same configuration as shown in FIG. 1. In FIG. 12, parts similar to the parts already described with reference to FIG. 1 and FIG. 10 are identified by the same reference numerals, and description thereof will be omitted.

In the modification shown in FIG. 12, as in the modification of FIG. 1 which modification is shown in FIG. 9, the secondary side series resonant capacitor C2B is omitted from the circuit of FIG. 10, and a secondary side series resonant circuit is formed in only a system for generating a secondary side direct-current output voltage +Eo subjected to constant-voltage control.

In this case, however, to obtain the operation of a voltage doubler half-wave rectifier circuit on a secondary winding N2B side, a series connection circuit of a smoothing capacitor CoB1 and a smoothing capacitor CoB2 is connected as shown in the figure as a smoothing capacitor CoB for providing a secondary side direct-current output voltage –Eo.

As with the smoothing capacitor CoB shown in FIG. 10, the smoothing capacitor CoB1 has a negative electrode terminal connected to the anode of a rectifier diode Do1B, and a positive electrode terminal connected to the other end part (winding start end part) of a secondary winding N2B. The smoothing capacitor CoB2 is provided such that the negative electrode terminal of the smoothing capacitor CoB2 is connected to the positive electrode terminal of the smoothing capacitor CoB1 and the positive electrode terminal of the smoothing capacitor CoB2 is connected to a secondary side ground.

In this case, unlike the case of FIG. 10, the cathode of a rectifier diode Do2B is connected directly to the secondary side ground rather than being connected to a line on the side of the winding start end part of the secondary winding N2B.

In a rectifying and smoothing circuit on the secondary winding N2B side in the above-described connection form, the rectifier diode Do2B conducts in one half period of an alternating voltage induced in the secondary winding N2B to charge the smoothing capacitor CoB2 with a rectification current. Thereby, a direct-current voltage having a level corresponding to once the level of the alternating voltage obtained in the secondary winding N2B is generated across the smoothing capacitor CoB2. In the other half period, the rectifier diode Do1B conducts to charge the smoothing capacitor CoB1 with a rectification current. Thereby, a direct-current voltage having a level corresponding to once the level of the alternating voltage obtained in the secondary winding N2B is generated across the smoothing capacitor CoB1.

Thus, the secondary side direct-current output voltage –Eo having a level corresponding to twice the alternating voltage induced in the secondary winding N2B in one period is generated across the series connection of the smoothing capacitors CoB1 and CoB2.

Also in this case, since the smoothing capacitors CoB are charged in the respective half periods, and the secondary side direct-current output voltage –Eo has the level corresponding to twice the level of the alternating voltage induced in the secondary winding N2B, a voltage doubler half-wave rectifier operation is obtained.

Since a secondary side series resonant circuit is formed in the system for generating the secondary side direct-current output voltage +Eo subjected to constant-voltage control, and the coupling coefficient of an isolated converter transformer PIT is set to the same value as in the case of FIG. 1 and FIG. 10, the configuration of such a modification of the second embodiment can similarly reduce the necessary control range of switching frequency. This improves cross regulation. That is, cross regulation is improved as compared with the circuit of FIG. 16.

Figure 13:
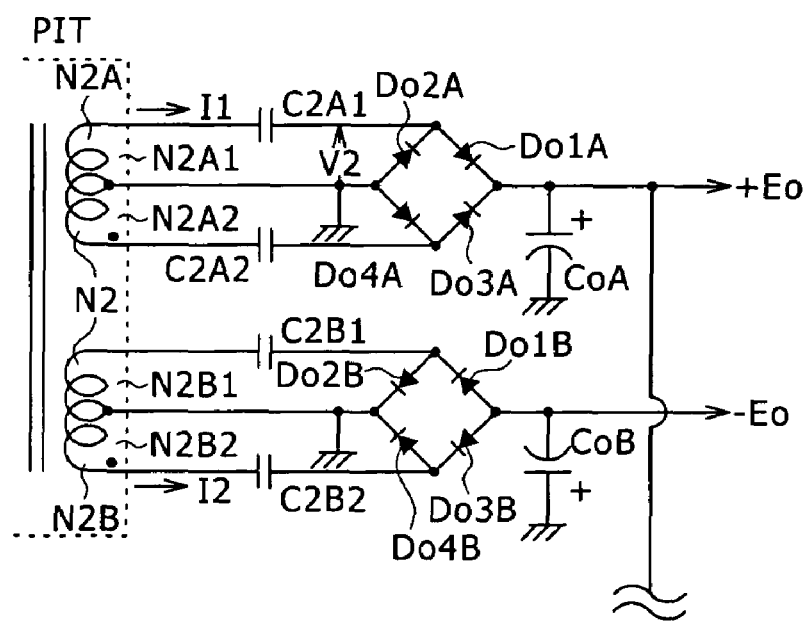
FIG. 13 is a circuit diagram showing an example of configuration of a power supply circuit according to a third embodiment.

A circuit diagram of FIG. 13 shows the configuration of a secondary side of a power supply circuit according to a third embodiment.

The configuration of a primary side of the circuit in FIG. 13 is also the same configuration as shown in FIG. 1. Parts similar to the parts already described with reference to FIG. 1 and FIG. 10 are identified by the same reference numerals, and description thereof will be omitted.

In the third embodiment shown in FIG. 13, a voltage doubler full-wave rectifier circuit is connected to each of a secondary winding N2A and a secondary winding N2B.

In this case, by providing a center tap to each of the secondary winding N2A and the secondary winding N2B, the secondary winding N2A and the secondary winding N2B are divided into secondary winding parts N2A1 and N2A2 and secondary winding parts N2B1 and N2B2, respectively. In this case, the center taps of the secondary winding N2A and the secondary winding N2B are connected to a secondary side ground.

Bridge rectifier circuits respectively formed by rectifier diodes Do1A to Do4A and rectifier diodes Do1B to Do4B similar to those provided in the circuit of FIG. 1 are provided to the secondary winding N2A and the secondary winding N2B.

On the secondary winding N2A side, an end part on the secondary winding part N2A1 side which end part is the winding termination end part of the secondary winding N2A is connected to a point of connection between the anode of the rectifier diode Do1A and the cathode of the rectifier diode Do2A via a series connection of a secondary side series resonant capacitor C2A1.

An end part on the secondary winding part N2A2 side which end part is the winding start end part of the secondary winding N2A is connected to a point of connection between the anode of the rectifier diode Do3A and the cathode of the rectifier diode Do4A via a series connection of a secondary side series resonant capacitor C2A2.

A point of connection between the cathode of the rectifier diode Do1A and the cathode of the rectifier diode Do3A is connected to the positive electrode terminal of a smoothing capacitor CoA. In this case, a point of connection between the anodes of the rectifier diodes Do2A and Do4A is connected to a point of connection between the above-described secondary winding N2A and the secondary side ground, and is thereby connected to the secondary side ground. The negative electrode terminal of the smoothing capacitor CoA is connected to the secondary side ground.

On the secondary winding N2B side, the secondary winding part N2B1, the secondary winding part N2B2, a secondary side series resonant capacitor C2B1, a secondary side series resonant capacitor C2B2, the rectifier diodes Do1B to Do4B, and a smoothing capacitor CoB shown in the figure are connected in the same connection form as the secondary winding part N2A1, the secondary winding part N2A2, the secondary side series resonant capacitor C2A1, the secondary side series resonant capacitor C2A2, the rectifier diodes Do1A to Do4A, and the smoothing capacitor CoA described above.

In this case, however, as is understood from the figure, the rectifier diodes Do1B to Do4B are connected in a different direction from the rectifier diodes Do1A to Do4A, respectively. The positive electrode terminal side of the smoothing capacitor CoB is connected to the secondary side ground, and the negative electrode terminal side of the smoothing capacitor CoB is connected to a point of connection between the rectifier diodes Do1B and Do3B.

That is, also in this case, a secondary side direct-current output voltage −Eo of negative polarity is obtained by a rectifying and smoothing circuit connected on the secondary winding N2B side.

The voltage doubler full-wave rectifier circuits formed in the above connection mode can be divided into first voltage doubler half-wave rectifier circuits formed by the secondary winding part N2A1, the secondary side series resonant capacitor C2A1, and the rectifier diodes Do1A and Do2A and the secondary winding part N2B1, the secondary side series resonant capacitor C2B1, and the rectifier diodes Do1B and Do2B, and second voltage doubler half-wave rectifier circuits formed by the secondary winding part N2A2, the secondary side series resonant capacitor C2A2, and the rectifier diodes Do3A and Do4A and the secondary winding part N2B2, the secondary side series resonant capacitor C2B2, and the rectifier diodes Do3B and Do4B on the secondary winding N2A side and the secondary winding N2B side, respectively.

In the first voltage doubler half-wave rectifier circuits, series connection circuits of the secondary winding part N2A1 and the secondary side series resonant capacitor C2A1 and the secondary winding part N2B1 and the secondary side series resonant capacitor C2B1, respectively, are formed. Thus, the leakage inductance component (L2A1) of the secondary winding part N2A1 and the capacitance of the secondary side series resonant capacitor C2A1 form a first secondary side series resonant circuit, and the leakage inductance component (L2B1) of the secondary winding part N2B1 and the capacitance of the secondary side series resonant capacitor C2B1 form a first secondary side series resonant circuit.

Similarly, in the second voltage doubler half-wave rectifier circuits, a series connection circuit of the secondary winding part N2A2 (N2B2) and the secondary side series resonant capacitor C2A2 (C2B2) is formed. Thus, the leakage inductance component (L2A2 and L2B2) of the secondary winding part N2A2 (N2B2) and the capacitance of the secondary side series resonant capacitor C2A2 (C2B2) form a second secondary side series resonant circuit.

The rectifying operation of the first voltage doubler half-wave rectifier circuits is as follows.

First describing the secondary winding N2A side, in one half period of an alternating voltage induced in the secondary winding N2A, a rectification current flows through a path of the secondary winding part N2A1, the rectifier diode Do2A, and the secondary side series resonant capacitor C2A1 in that order, whereby the secondary side series resonant capacitor C2A1 is charged with the rectification current. As a result of the rectifying operation at this time, a voltage having a level corresponding to once an alternating voltage induced in the secondary winding part N2A1 is generated across the secondary side series resonant capacitor C2A1.

In the subsequent period of the other half cycle of the alternating voltage of the secondary winding N2A, a rectification current flows through a path of the secondary winding part N2A1, the secondary side series resonant capacitor C2A1, the rectifier diode Do1A, and the smoothing capacitor CoA in that order. At this time, the smoothing capacitor CoA is charged in a state in which a voltage induced in the secondary winding part N2A1 is superimposed on the voltage obtained across the secondary side series resonant capacitor C2A1 by the rectifying operation in the previous half period of the alternating voltage of the secondary winding N2A. Thereby, a voltage having a level twice that of the alternating voltage of the secondary winding part N2A1 is generated across the smoothing capacitor CoA.

The first voltage doubler half-wave rectifier circuit on the secondary winding N2B side performs the same operation as described above.

Specifically, the first voltage doubler half-wave rectifier circuit performs voltage doubler half-wave rectifier operation in which during one half period of the alternating voltage of the secondary winding N2B, a voltage having a level corresponding to once the alternating voltage of the secondary winding part N2B1 is generated across the secondary side series resonant capacitor C2B1, and during the other half period of the alternating voltage of the secondary winding N2B, the smoothing capacitor CoB is charged with a level obtained by superimposing the alternating voltage of the secondary winding part N2B1 on the voltage across the secondary side series resonant capacitor C2B1, whereby a voltage having a level corresponding to twice the alternating voltage of the secondary winding part N2B1 is obtained as voltage across the smoothing capacitor CoB.

Incidentally, in the above-described voltage doubler half-wave rectifier operation, a current flows through the secondary side series resonant capacitor C2 in each half period in directions of both positive polarity and negative polarity. The first secondary side series resonant circuit correspondingly performs resonant operation.

The second voltage doubler half-wave rectifier circuits perform the same voltage doubler half-wave rectifier operation as the first voltage doubler half-wave rectifier circuits by the secondary winding part N2A2, the secondary side series resonant capacitor C2A2, and the rectifier diodes Do3A and Do4A and the secondary winding part N2B2, the secondary side series resonant capacitor C2B2, and the rectifier diodes Do3B and Do4B in periodic timing shifted by precisely a half period with respect to the rectifying operation of the first voltage doubler half-wave rectifier circuits. The resonant operation of the second secondary side series resonant circuits is obtained by this rectifying operation.

By performing such rectifying operation, the smoothing capacitor CoA and the smoothing capacitor CoB are charged by the first voltage doubler half-wave rectifier circuits or charged by the second voltage doubler half-wave rectifier circuits repeatedly in each half period of the alternating voltages of the secondary winding N2A and the secondary winding N2B.

That is, a rectifier circuit as a whole connected to the secondary winding N2A performs a voltage doubler full-wave rectifier operation in which the smoothing capacitor CoA is charged with a charging potential corresponding to twice the alternating voltage induced in the secondary winding part N2A1 or N2A2 in each half-wave period in which the alternating voltage of the secondary winding N2A is positive/negative. Also, a rectifier circuit as a whole connected to the secondary winding N2B performs a voltage doubler full-wave rectifier operation in which the smoothing capacitor CoB is charged with a charging potential corresponding to twice the alternating voltage induced in the secondary winding part N2B1 or N2B2 in each half-wave period in which the alternating voltage of the secondary winding N2B is positive/negative.

Figure 14:
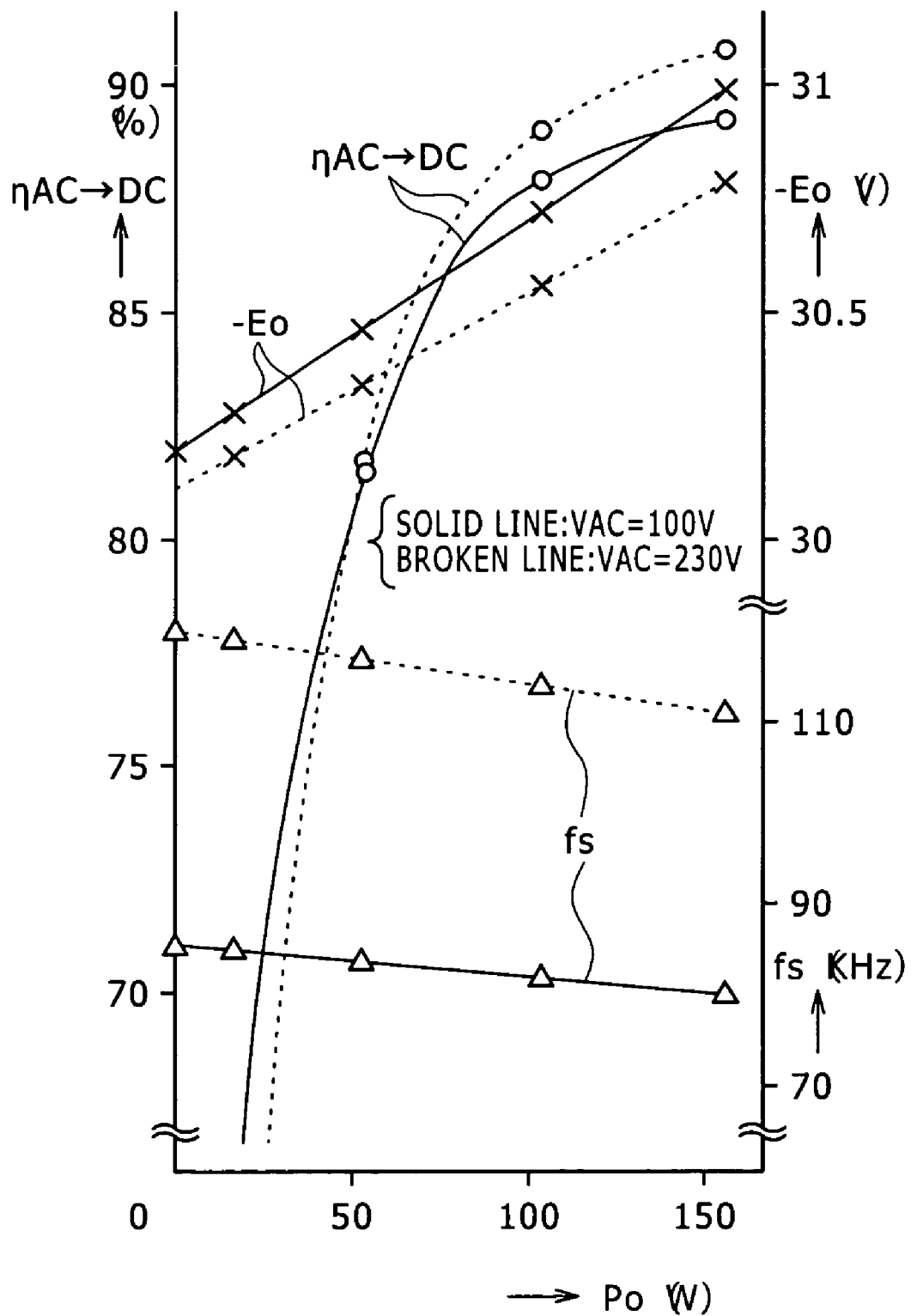
FIG. 14 is a characteristic diagram showing characteristics of power conversion efficiency, switching frequency, and cross regulation with respect to load variation in the power supply circuit according to the third embodiment.

FIG. 14 shows characteristics of switching frequency fs, AC→DC power conversion efficiency ($\eta$AC→DC), and cross regulation (-Eo) with respect to load variation in a range of maximum load power Pomax=150 W to minimum load power Pomin=0 W (no load) in the circuit according to the third embodiment shown in FIG. 13. Also in this figure, characteristics at the time of the alternating input voltage VAC=100 V corresponding to the AC 100 V system are represented by solid lines, and characteristics at the time of the alternating input voltage VAC=230 V corresponding to the AC 200 V system are represented by broken lines.

Incidentally, in obtaining the characteristics shown in FIG. 14, conditions for selecting parts of the circuit of FIG. 13 are shown in the following.

Isolated converter transformer PIT: gap G=2.4 mm, and coupling coefficient k=0.65
Primary winding N1=37 T
Secondary winding N2A=secondary winding part N2A1+ secondary winding part N2A2=3 T+3 T=6 T
Secondary winding N2B=secondary winding part N2B1+ secondary winding part N2B2=3 T+3 T=6 T
Primary side series resonant capacitor C1=0.027 µF
Primary side partial resonant capacitor Cp=1000 pF
Secondary side series resonant capacitor C2A1=C2A2=C2B1=C2B2=1.0 µF.

In the third embodiment, as in the power supply circuit according to the first embodiment shown in FIG. 1, the gap G formed in the inner magnetic leg of a core in the isolated converter transformer PIT is set to about 2.4 mm to obtain a coupling coefficient k=about 0.65 as described above.

In addition, also in this case, a secondary side series resonant circuit is formed in at least a system for generating a secondary side direct-current output voltage subjected to constant-voltage control. Thus, as in the case of FIG. 1, the necessary control range of switching frequency is reduced.

Also in this case, the AC→DC power conversion efficiency ($\eta$AC→DC) in FIG. 14 is increased as the load power Po is increased. Measurement results show that under the load condition of the maximum load power Po=150 W, the AC→DC power conversion efficiency $\eta$AC→DC=89.8% when the alternating input voltage VAC=100 V and the AC→DC power conversion efficiency $\eta$AC→DC=91.1% when the alternating input voltage VAC=230 V.

The switching frequency fs is decreased as the load becomes heavier. A result obtained shows that when the alternating input voltage VAC=100 V, a variation range $\Delta$fs of the switching frequency fs with respect to the variation of the load power Po=150 W to 0 W is 5.2 kHz.

Another result obtained shows that when the alternating input voltage VAC=230 V, the variation range $\Delta$fs of the switching frequency fs with respect to the same load variation is 8.4 kHz.

It is understood also from these experimental results that the configuration of FIG. 13 greatly reduces the necessary control range of the switching frequency in each single range. Thus, as in the case of the first embodiment, high-speed transient response characteristics are improved.

Also in this case, the secondary side direct-current output voltage -Eo is lowered as the load becomes heavier, as shown in the figure.

A result obtained shows that when the alternating input voltage VAC=100 V, a variation range $\Delta$-Eo of the secondary side direct-current output voltage -Eo with respect to the variation of the load power Po=150 W to 0 W is 0.8 V.

Another result obtained shows that when the alternating input voltage VAC=230 V, the variation range $\Delta$-Eo with respect to the same load variation is 0.6 V.

It is understood also from the results that the circuit of FIG. 13 improves cross regulation.

Incidentally, an obtained result of an experiment on the power supply circuit according to the third embodiment shows that the peak level Ap-1 of the rectification current I1 and the peak level Ap-2 of the rectification current I2 shown in FIG. 13 are both the same level of 8 Ap under the condition of the alternating input voltage VAC=100 V when the load power Po=150 W. Another result obtained shows that the peak level Ap-1 and the peak level Ap-2 are the same level of 5.5 Ap under the condition of the alternating input voltage VAC=230 V.

Under the same load power condition, the peak level Ap-Q2 of a switching current IQ2 is 3.7 Ap when the alternating input voltage VAC=100 V and the peak level Ap-Q2 of the switching current IQ2 is 2.9 Ap when the alternating input voltage VAC=230 V.

Figure 15:
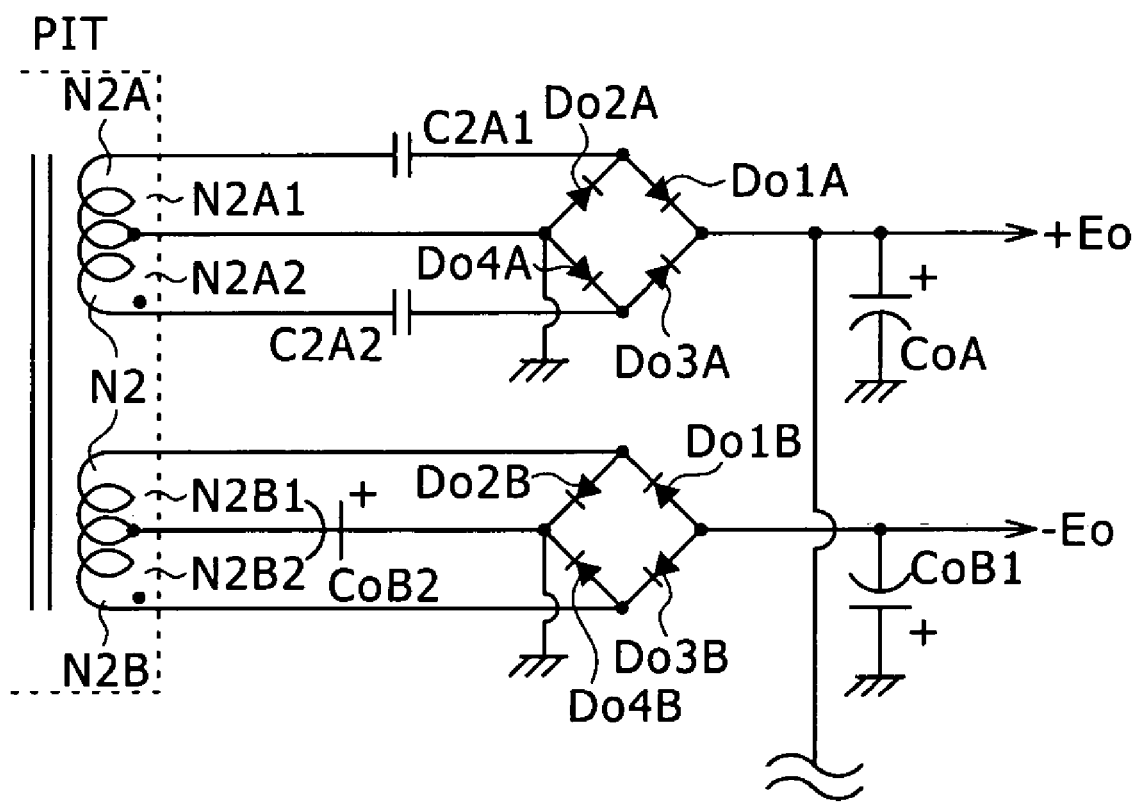
FIG. 15 is a circuit diagram showing the configuration of a power supply circuit as a modification of the third embodiment.

FIG. 15 shows the configuration of a modification of the third embodiment.

As in the modification of FIG. 1 which modification is shown in FIG. 9 and the modification of FIG. 10 which modification is shown in FIG. 12, the modification of the third embodiment is based on the configuration of FIG. 13, but no series resonant circuit is formed in a direct-current output voltage generating system on a secondary winding N2B side that is not subjected to constant-voltage control.

Incidentally, a configuration on the primary side of the circuit of FIG. 15 is the same as shown in FIG. 1. In FIG. 15, parts already described with reference to FIG. 13 are identified by the same reference numerals, and description thereof will be omitted.

In the modification shown in FIG. 15, the secondary side series resonant capacitors C2B1 and C2B2 each connected in series with the secondary winding N2B in the circuit of FIG. 13 are omitted.

Also in this case, to obtain a similar voltage doubler full-wave rectifier operation to that of the circuit of FIG. 13, a smoothing capacitor CoB2 is inserted between a point of connection between the cathodes of rectifier diodes Do2B and Do4B and the center tap of a secondary winding N2B. As shown in the figure, the negative electrode terminal side of the smoothing capacitor CoB2 is connected to the center tap of the secondary winding N2B, and the positive electrode terminal side of the smoothing capacitor CoB2 is connected to the point of connection between the rectifier diodes Do2B and Do4B.

In a rectifier circuit on the secondary winding N2B side thus formed, in one half period of an alternating voltage induced in the secondary winding N2B, a rectification current flows through a path of the secondary winding part N2B1, the rectifier diode Do2B, the smoothing capacitor CoB2, and a secondary winding part N2B1 in that order. A direct-current voltage having a level corresponding to once the level of an alternating voltage induced in the secondary winding part N2B1 is generated across the smoothing capacitor CoB2.

Also, in this period, on a secondary winding part N2B2 side, a rectification current flows through a path of a secondary winding part N2B2, the smoothing capacitor CoB2, a smoothing capacitor CoB1, a rectifier diode Do3B, and the secondary winding part N2B2 in that order. The smoothing capacitor CoB1 is thereby charged with a level obtained by superimposing the alternating voltage of the secondary winding part N2B2 on the voltage obtained across the smoothing capacitor CoB2 as described above. Thus, a voltage across the smoothing capacitor CoB1 has a level corresponding to twice the alternating voltage of the secondary winding part N2B2.

In the other half period, a rectification current flows through a path of the secondary winding part N2B2, the rectifier diode Do4B, the smoothing capacitor CoB2, and the secondary winding part N2B2 in that order. A direct-current voltage having a level corresponding to once the level of an alternating voltage induced in the secondary winding part N2B2 is generated across the smoothing capacitor CoB2.

Also, on the secondary winding part N2B1 side, a rectification current flows through a path of the secondary winding part N2B1, the smoothing capacitor CoB2, the smoothing capacitor CoB1, a rectifier diode Do1B, and the secondary winding part N2B1 in that order. The smoothing capacitor CoB1 is thereby charged with a level obtained by the alternating voltage of the secondary winding part N2B1 and the voltage obtained across the smoothing capacitor CoB2. Thus, a voltage across the smoothing capacitor CoB1 has a level corresponding to twice the alternating voltage obtained in the secondary winding part N2B1.

As is understood from such rectifying operation, also in this case, a rectifier circuit as a whole connected to the secondary winding N2B charges the smoothing capacitor CoB1 in each half period of the alternating voltage obtained in the secondary winding N2B.

That is, also in this case, a voltage doubler full-wave rectifier operation is obtained in which the smoothing capacitor CoB1 is charged with a charging potential corresponding to twice the alternating voltage induced in the secondary winding part N2B1 or N2B2 in each half-wave period in which the alternating voltage of the secondary winding N2B is positive/negative.

Since a secondary side series resonant circuit is formed in the system for generating the secondary side direct-current output voltage +Eo subjected to constant-voltage control, and the coupling coefficient of an isolated converter transformer PIT is set to the same value as in the case of FIG. 13, the configuration of such a modification of the third embodiment can also reduce the necessary control range of switching frequency. This improves cross regulation as in FIG. 13. That is, cross regulation is improved as compared with the conventional configuration of FIG. 16.

It is to be noted that the present invention is not to be limited to the embodiments described thus far.

For example, the structure of the isolated converter transformer PIT, including the core type and the like, may be changed as appropriate.

Also, while the switching converters illustrated in the embodiments are based on an externally excited current resonant converter, a self-excited current resonant converter, for example, can be incorporated. Further, as switching devices selected in the switching converters, a device other than a MOS-FET, such for example as a bipolar transistor or an IGBT (Insulated Gate Bipolar Transistor), may be used.

Further, the constant or the like of each part element described earlier may be changed as appropriate according to actual conditions or the like.

Further, while the secondary side direct-current output voltage +Eo side supplies the detection input for constant-voltage control, a configuration in which the secondary side direct-current output voltage −Eo side supplies a detection input is also possible.

However, when a secondary side series resonant circuit is formed only on one side as in the modifications in the case of constant-voltage control on the −Eo side, a series resonant circuit on the +Eo side is omitted. That is, in the present invention, it suffices to form a secondary side series resonant circuit in a direct-current output voltage generating system on at least the side of the detection input for constant-voltage control (the side subjected to constant-voltage control).

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply circuit comprising:
   switching means formed with a switching device supplied with a direct-current input voltage and performing switching operation;
   switching-driving means for switching-driving said switching device;
   an isolated converter transformer formed by winding a primary winding supplied with a switching output obtained by the switching operation of said switching means and a first secondary winding and a second secondary winding in which an alternating voltage is induced by the primary winding;
   a primary side series resonant circuit formed by at least a leakage inductance component of the primary winding of said isolated converter transformer and a capacitance of a primary side series resonant capacitor connected in series with said primary winding, a first resonant frequency being set to said primary side series resonant circuit, said primary side series resonant circuit converting operation of said switching means into a current resonant type operation;
   a first secondary side series resonant circuit formed by at least a leakage inductance component of said first secondary winding of said isolated converter transformer and a capacitance of a first secondary side series resonant capacitor connected in series with the first secondary winding, a second resonant frequency being set to said first secondary side series resonant circuit;
   first secondary side direct-current output voltage generating means for generating a first secondary side direct-current output voltage by performing a rectifying operation on the alternating voltage obtained in said first secondary winding, and smoothing a rectification output resulting from the rectifying operation by a first secondary side smoothing capacitor;

second secondary side direct-current output voltage generating means for generating a second secondary side direct-current output voltage having a same absolute value level as said first secondary side direct-current output voltage and having different polarity from polarity of said first secondary side direct-current output voltage by performing a rectifying operation on the alternating voltage obtained in said second secondary winding, and smoothing a rectification output resulting from the rectifying operation by a second secondary side smoothing capacitor; and constant-voltage control means for performing constant-voltage control on said first secondary side direct-current output voltage by varying switching frequency of said switching means by controlling said switching-driving means according to level of said first secondary side direct-current output voltage, wherein length of a gap formed at a predetermined position of a core of said isolated converter transformer is set such that an output characteristic of an electromagnetic coupling type resonant circuit formed with said primary side series resonant circuit and said first secondary side series resonant circuit with respect to an input of a frequency signal having said switching frequency is a unimodal characteristic.

2. The switching power supply circuit as claimed in claim 1, wherein a second secondary side series resonant circuit is formed by connecting a second secondary side series resonant capacitor in series with said second secondary winding.

3. The switching power supply circuit as claimed in claim 1, wherein said first secondary side direct-current output voltage generating means and said second secondary side direct-current output voltage generating means have a bridge rectifier circuit as a rectifier circuit performing said rectifying operation.

4. The switching power supply circuit as claimed in claim 1, wherein said first secondary side direct-current output voltage generating means and said second secondary side direct-current output voltage generating means each have a voltage doubler half-wave rectifier circuit formed by connecting required rectifier diodes with said secondary side smoothing capacitor to perform voltage doubler half-wave rectifier operation on the alternating voltage induced in said secondary winding.

5. The switching power supply circuit as claimed in claim 1, wherein each of said secondary windings is divided into a first secondary winding part and a second secondary winding part by being provided with a center tap;

said first secondary side direct-current output voltage generating means and said second secondary side direct-current output voltage generating means include a first voltage doubler half-wave rectifier circuit formed by connecting required rectifier diodes with said secondary side smoothing capacitor to perform voltage doubler half-wave rectifier operation on the alternating voltage induced in said first secondary winding part, and a second voltage doubler half-wave rectifier circuit formed by connecting required rectifier diodes with said secondary side smoothing capacitor to perform voltage doubler half-wave rectifier operation on the alternating voltage induced in said second secondary winding part; and said first secondary side direct-current output voltage generating means and said second secondary side direct-current output voltage generating means are formed as a voltage doubler full-wave rectifier circuit in which charging of said secondary side smoothing capacitor by the rectifier operation of said first voltage doubler half-wave rectifier circuit and charging of said secondary side smoothing capacitor by the rectifier operation of said second voltage doubler half-wave rectifier circuit are performed alternately in timing of half periods of each of said secondary windings.

* * * * *

UNITED STATES PATENT AND TRADEMARK OFFICE
CERTIFICATE OF CORRECTION

PATENT NO. : 7,285,875 B2
APPLICATION NO. : 11/225733
DATED : October 23, 2007
INVENTOR(S) : Masayuki Yasumura It is certified that error appears in the above-identified patent and that said Letters Patent is hereby corrected as shown below:

Column 1, line 67, "circuit) A" should read --circuit). A--;

Column 6, line 60, "such for example" should read --such, for example,--;

Column 7, line 51, "when for example" should read --when, for example,--;

Column 7, line 63, "therefore for example" should read --therefore, for example,--;

Column 9, line 27, "-Eo=1.0 V" should read -- -Eo is equal to 1.0 V--;

Column 13, line 47, "of for example" should read --of, for example,--;

Column 27, line 16, "include for example" should read --include, for example,--;

Column 27, line 58, "and obtain" should read --and can obtain--;

Column 38, line 11, "such for example" should read --such, for example,--;

Column 38, line 39, "for switching-driving" should read --for driving--;

Column 40, line 39, "timing" should read --timings--.

Signed and Sealed this

Sixth Day of October, 2009

David J. Kappos
*Director of the United States Patent and Trademark Office*